US011682063B2

(12) United States Patent
Liu et al.

(10) Patent No.: US 11,682,063 B2
(45) Date of Patent: Jun. 20, 2023

(54) SHOPPING LIST AND CART INTEGRATION

(71) Applicant: Amazon Technologies, Inc., Seattle, WA (US)

(72) Inventors: Guang Liu, Sammamish, WA (US); Matthew Charles Johnson, Seattle, WA (US); Timothy R Heithaus, Issaquah, WA (US); Ruimin Zhang, Issaquah, WA (US); Jason Stephen Merron, Seattle, WA (US); Neven Tomislav Boric Bargetto, Redmond, WA (US); Andrew Michael Nienhaus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 16/877,307

(22) Filed: May 18, 2020

(65) Prior Publication Data
US 2021/0358012 A1 Nov. 18, 2021

(51) Int. Cl.
G06Q 30/00 (2023.01)
G06Q 30/0601 (2023.01)
(Continued)

(52) U.S. Cl.
CPC ....... G06Q 30/0633 (2013.01); G01C 21/206 (2013.01); G06F 3/0482 (2013.01);
(Continued)

(58) Field of Classification Search
CPC ........... G06Q 30/0633; G06Q 30/0601; G06Q 30/0625; G06Q 30/0639; G06Q 30/0641; G06F 3/0482
See application file for complete search history.

(56) References Cited

U.S. PATENT DOCUMENTS 10,140,820 B1 11/2018 Zalewski et al.
10,242,340 B2 * 3/2019 Douglas ............... G06Q 20/208
(Continued)

FOREIGN PATENT DOCUMENTS

EP 2701102 A1 2/2014
WO 2018194581 A1 10/2018

OTHER PUBLICATIONS

Chiang, Hsin-Han, et al. "Development of smart shopping carts with customer-oriented service." 2016 International Conference on System Science and Engineering (ICSSE). IEEE, 2016.*
(Continued)

Primary Examiner — Kathleen Palavecino
(74) Attorney, Agent, or Firm — Kilpatrick Townsend & Stockton LLP

(57) ABSTRACT

Techniques described herein include systems and methods for utilizing a shopping list generated by a user in one or more shopping list features. A list of items including keywords not associated with specific items may be received. A user interface may be updated to present the list of items, with a first area of the user interface corresponding to uncompleted tasks associated with a keyword of the list, and a second area corresponding to completed tasks associated with a keyword of the list. One or more sensors may receive information about an item. Input about an interaction with the user interface and a keyword of the list may be received. The user interface may be updated to move the keyword of the list from the first area to the second area. A mapping of the keyword to the item may be updated by a computer system.

11 Claims, 24 Drawing Sheets

(51) Int. Cl.
*H04W 4/38* (2018.01)
*G06F 9/451* (2018.01)
*G06N 20/00* (2019.01)
*G01C 21/20* (2006.01)
*G06F 3/0482* (2013.01)
*G06Q 10/047* (2023.01)
*G06Q 10/0631* (2023.01)
*H04L 9/40* (2022.01)
*H04W 4/021* (2018.01)
*G06Q 30/02* (2023.01)

(52) U.S. Cl.
CPC .............. *G06F 9/451* (2018.02); *G06N 20/00* (2019.01); *G06Q 10/047* (2013.01); *G06Q 10/06316* (2013.01); *G06Q 30/0601* (2013.01); *G06Q 30/0623* (2013.01); *G06Q 30/0625* (2013.01); *G06Q 30/0631* (2013.01); *G06Q 30/0639* (2013.01); *G06Q 30/0641* (2013.01); *H04L 63/0876* (2013.01); *H04W 4/021* (2013.01); *H04W 4/38* (2018.02); *G06Q 30/0281* (2013.01)

(56) References Cited

U.S. PATENT DOCUMENTS

| | | | |
|---|---|---|---|
| 10,445,376 B2 * | 10/2019 | Azimi | G06N 3/084 |
| 2008/0237339 A1 | 10/2008 | Stawar et al. | |
| 2012/0277991 A1 * | 11/2012 | Wagner | G06Q 30/00 |
| | | | 701/410 |
| 2012/0296751 A1 | 11/2012 | Napper | |
| 2014/0214589 A1 | 7/2014 | Pedley et al. | |
| 2015/0025969 A1 * | 1/2015 | Schroll | G06Q 20/208 |
| | | | 705/14.64 |
| 2015/0149298 A1 | 5/2015 | Tapley | |
| 2019/0073656 A1 | 3/2019 | Joseph et al. | |
| 2021/0224765 A1 * | 7/2021 | Siddique | G06Q 10/10 |
| 2022/0129968 A1 * | 4/2022 | Koontz | G06Q 30/0633 |

OTHER PUBLICATIONS

PCT/US2021/027630, "International Search Report and Written Opinion," dated Jul. 20, 2021, 14 pages.

* cited by examiner

SHOPPING LIST AND CART INTEGRATION

BACKGROUND

Consumers want the ability to shop and pickup items at a store in an efficient manner. For example, a customer may want to minimize the amount of time spent at a store completing a shopping trip. Stores may desire to leverage available advantages among each other in order to remain relevant. For this reason, stores need to provide a more appealing shopping experience while at the same time increasing convenience for their customers. Customers may be unaware of a store's layout, they may forget items that they intended to purchase, and this can result in multiple store trips or unsatisfactory shopping journeys.

BRIEF DESCRIPTION OF THE DRAWINGS

Various embodiments in accordance with the present disclosure will be described with reference to the drawings, in which.

DETAILED DESCRIPTION

Figure 1A:
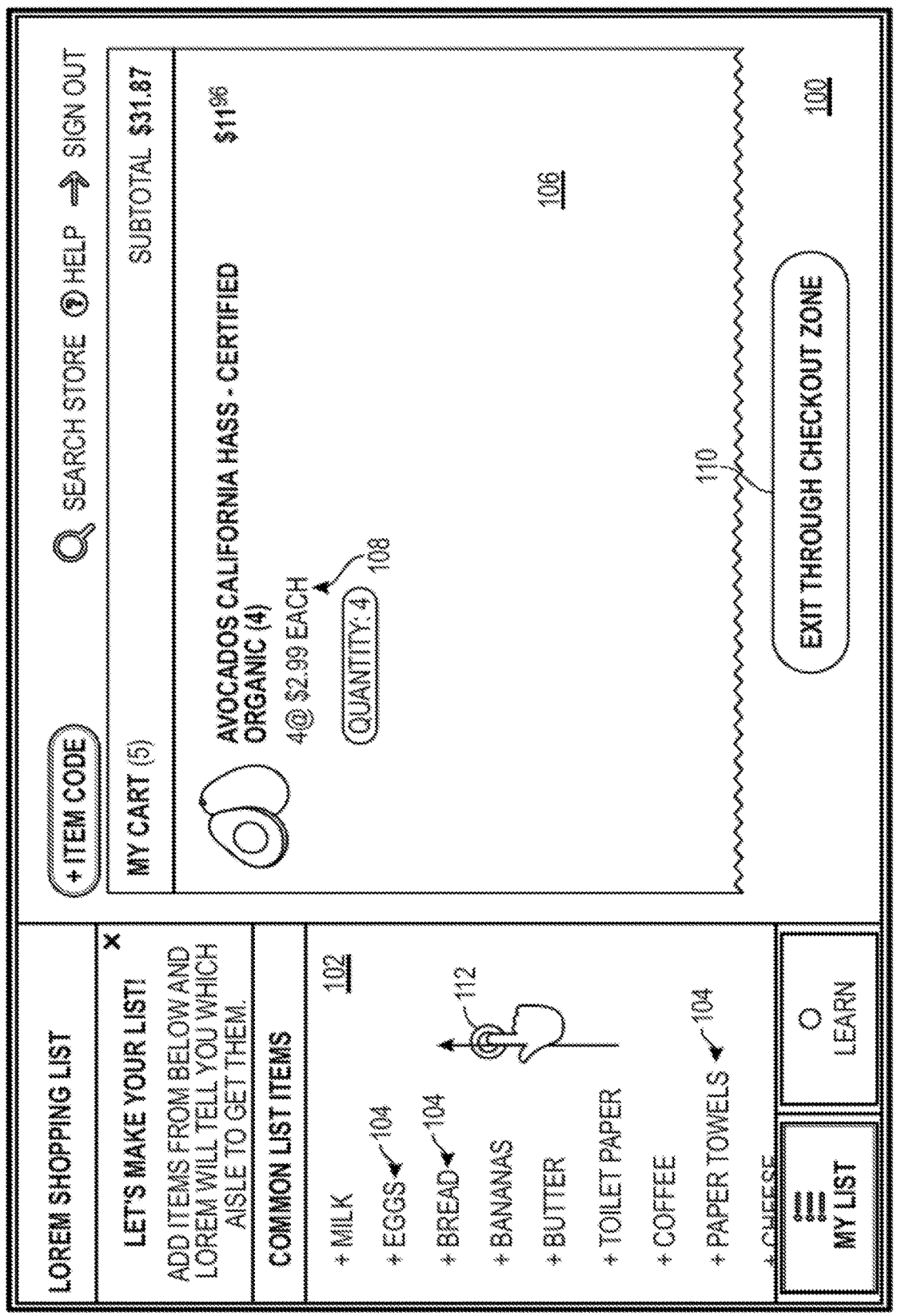
FIG. 1A illustrates an example user interface for a shopping list feature corresponding to providing recommended keywords to start a shopping list, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for a shopping list feature. Specifically, the disclosure is directed to using data provided by a user during interacting with items placed in a cart that correspond to keywords of a shopping list to update a mapping of items to keywords and keywords to items in order to implement a number of features to provide an efficient shopping trip for the user. In accordance with at least one embodiment, a computer system implementing the shopping list feature may train a machine-learning algorithm using the data or information provided by users interacting with items, keywords, and a cart during a shopping journey at a store to determine a correct mapping of an item to a keyword, and predict an item that corresponds to a keyword provided by a user in a shopping list. In embodiments, a user may generate a shopping list that includes one or more keywords that are not associated with specific items. For example, a user may generate a shopping list that includes a keyword of "milk." The keyword may not, initially, be tied to a specific brand or type of milk such as almond milk. As the user provides data to the computer system during shopping journeys to a store where the user continues to purchase almond milk whenever the keyword milk appears on their shopping list, the machine learning algorithm may learn that this particular user associates almond milk with the key word milk. In accordance with at least one embodiment, a user may import a shopping list of keywords from a first user device to a second user device or computer system of a cart at a store. The shopping list may be generated by the user prior to arriving at the store via a software application of their user device (first user device). Other users that are authorized by the user may also add items or keywords to the shopping list and the user and the other authorized users may add items or keywords to the shopping list while they are in the store as well.

By way of illustrative example, consider a scenario in which a user enters a store with a mobile phone where the mobile phone has an application for maintaining and updating a shopping list of keywords or items. The user may approach a cart of the store that has one or more sensors, a computer system, and a basket for receiving items. The user may authenticate themselves with the cart by presenting a quick response (QR) code generated by the user device to the computer system of the cart. Once the computer system of the cart authenticates the user or user device, a user interface of the cart may be updated to present the same shopping list that is maintained on the user device. Thereafter, the user may travel throughout the store and add items to the cart. As a user places an item, such as a specific brand of soft drink in their cart, sensors of the cart can provide information about the item to the computer system of the cart. The user may then interact with the user interface, such as by checking a box next to the keyword "soda" on their shopping list. The input provided by the user interacting with the user interface and the information from the sensors can be utilized by the computer system of the cart to update the user interface. For example, the keyword "soda" may move from an uncompleted task area of the user interface to a completed task area of the user interface. The information provided by the user placing the specific brand of soft drink in the cart and interacting with the keyword "soda" can be used by the computer system, or transmitted to a server computer, for updating the mapping of the keyword "soda" to the specific brand of soft drink. The information may also be used to train a machine learning algorithm such that subsequent shopping journeys may replace the keyword "soda" with the specific brand of soft drink or implement other features of the shopping list features disclosed herein. In embodiments, the computer system may automatically move a keyword from an uncompleted task area of the user interface to a completed task area of the user interface in response to receiving input or data from the sensors of the cart as a user adds an item to the cart that the sensors detect.

In accordance with at least one embodiment, the shopping list feature can generate recommendations for keywords that a user may add to a shopping list if they have not already generated a shopping list. In embodiments, the computer system implementing the shopping list feature can generate recommendations for keywords for user by a user based on aggregated information from a plurality of users providing keywords on their shopping lists. The computer system may be configured to associate a category for a keyword based on information from a store, items in a category, or other mapping techniques. For example, a shopping list for a user, which is displayed via a user interface of a cart, may include an indication of "household" for a keyword on the shopping list that corresponds to "dishwasher detergent." The categories for the keywords may be based on information from a computer system or database associated with a store offering items.

In accordance with at least one embodiment, the shopping list feature may include maintaining a plurality of shopping lists generated by a user, where each shopping list may be associated with a particular store, such as a particular grocery store chain, or a particular event, such as the super bowl. As a user enters a store and authenticates themselves with a cart, the user interface may be configured to present an option for the user to select a particular shopping list to utilize while at the store. Each different shopping list may include different keywords. The keywords may correspond to items that are only offered by a particular store. Information obtained by the computer system of interactions by the user with items, keywords, and the user interface may be used to generate further recommendations, replace keywords with specific items, or generate routes to aid a user in their shopping journey on subsequent trips as the machine learning algorithm is trained.

In accordance with at least one embodiment, the shopping list feature may include generating and presenting a map of a store as well as locations of items in the map that correspond to the keywords of the user's shopping list. For example, the user interface of the computer system of the cart may update, in response to user input, to display a representation of a layout of the store that the user is shopping at. The user can request that all the keywords on their shopping list be mapped onto the representation of the layout, request that a specific keyword be mapped, or be presented with a route to most efficiently obtain all the items on their shopping list. In embodiments, the user interface may be updated to change the order of presentation of the keywords on the shopping list from a default presentation or an order of presentation that corresponds to how the user added the items to the shopping list to a different order of presentation. The different order of presentation can correspond to an order for most efficient retrieval of items from the store or for items that are closest to a current location of the user and the cart within the store.

FIG. 1A illustrates an example user interface 100 for a shopping list feature corresponding to providing recommended keywords to start a shopping list, in accordance with embodiments. The user interface 100 includes a recommended keyword area 102 that further includes one or more recommended keywords 104, an area 106 for presenting item detail information 108 for an item added to a cart, and instructions 110 on how to pay for the items added to the cart. In accordance with at least one embodiment, a computer system implementing the shopping list feature described herein may generate one or more keywords or recommended keywords 104. In embodiments, the computer system may generate the recommended keywords 104 based on aggregate information obtained from a plurality of users, shopping lists, items offered by stores, or other information. For example, the recommended keywords 104 may correspond to keywords most selected by other users during generation of their own shopping lists.

The recommended keywords may be generated based on a location of the cart of the user interface 100 and a store location that maps to the location of the cart. In embodiments, the computer system may generate the recommended keywords 104 based on the inventory of items offered by the store such that keywords that do not correspond to items offered by the store will not be recommended to a user. The area 106 of the user interface 100 may display item details 108 for an item already added to the cart. As described herein, the cart may utilize one or more sensors to interact with an item added to a cart, identify information about the item, and update the user interface 100 to present item details 108 for the item. In embodiments, item details 108 for an item may include a name or title for the item, a specific brand for the item, dimensions for the item, a price for the item, and a quantity of the item added to the cart. The user interface 100 may also display, in area 106, a total cost for the items added to the cart as a running tally so that the user knows how much they will be charged when they follow the instructions 110 on how to pay for the items and exit the store. In embodiments, the user interface 100 may be configured to receive input 112 from a user interacting with the user interface. For example, FIG. 1 may depict a user utilizing a gesture input as input 112 to scroll through the various recommended keywords 104 presented in area 102 of the user interface 100.

Figure 1B:
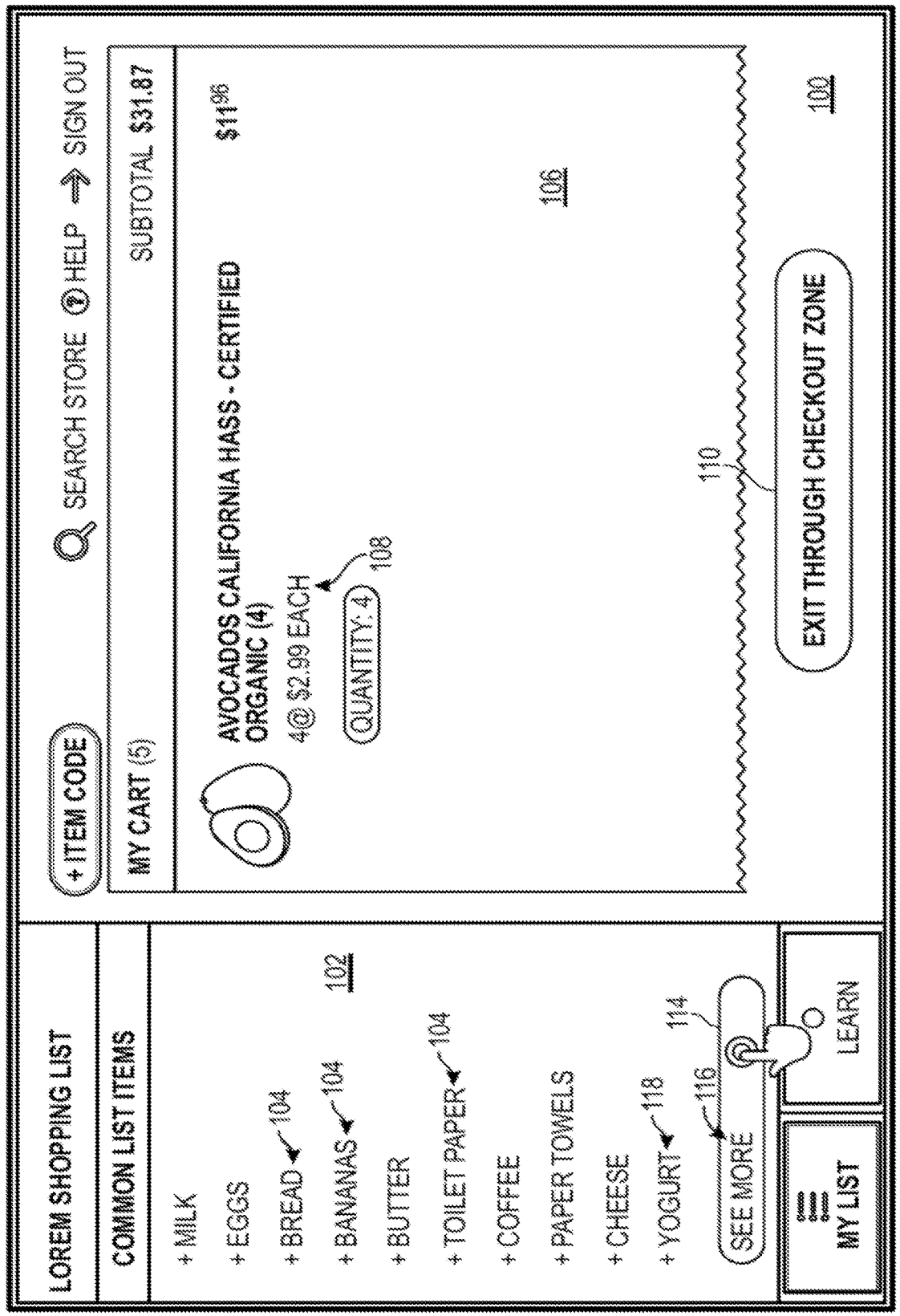
FIG. 1B illustrates an example user interface for a shopping list feature corresponding to providing recommended keywords to start a shopping list, in accordance with embodiments.

FIG. 1B illustrates an example user interface 100 for a shopping list feature corresponding to providing recommended keywords to start a shopping list, in accordance with embodiments. User interface 100 of FIG. 1B depicts additional features which may be generated and displayed, via the user interface 100, by the computer system implementing the shopping list feature. The user interface 100 of FIG. 1B includes user input 114 interacting with a see more feature 116 of area 102 which results in user interface 100 presenting more recommended keywords 118. In embodiments, area 102 of the user interface may be configured to present a certain number of recommended keywords 104 and 118 based on preferences specified by the user, by a store, or by an entity associated with the computer system implementing the shopping list feature.

Figure 2A:
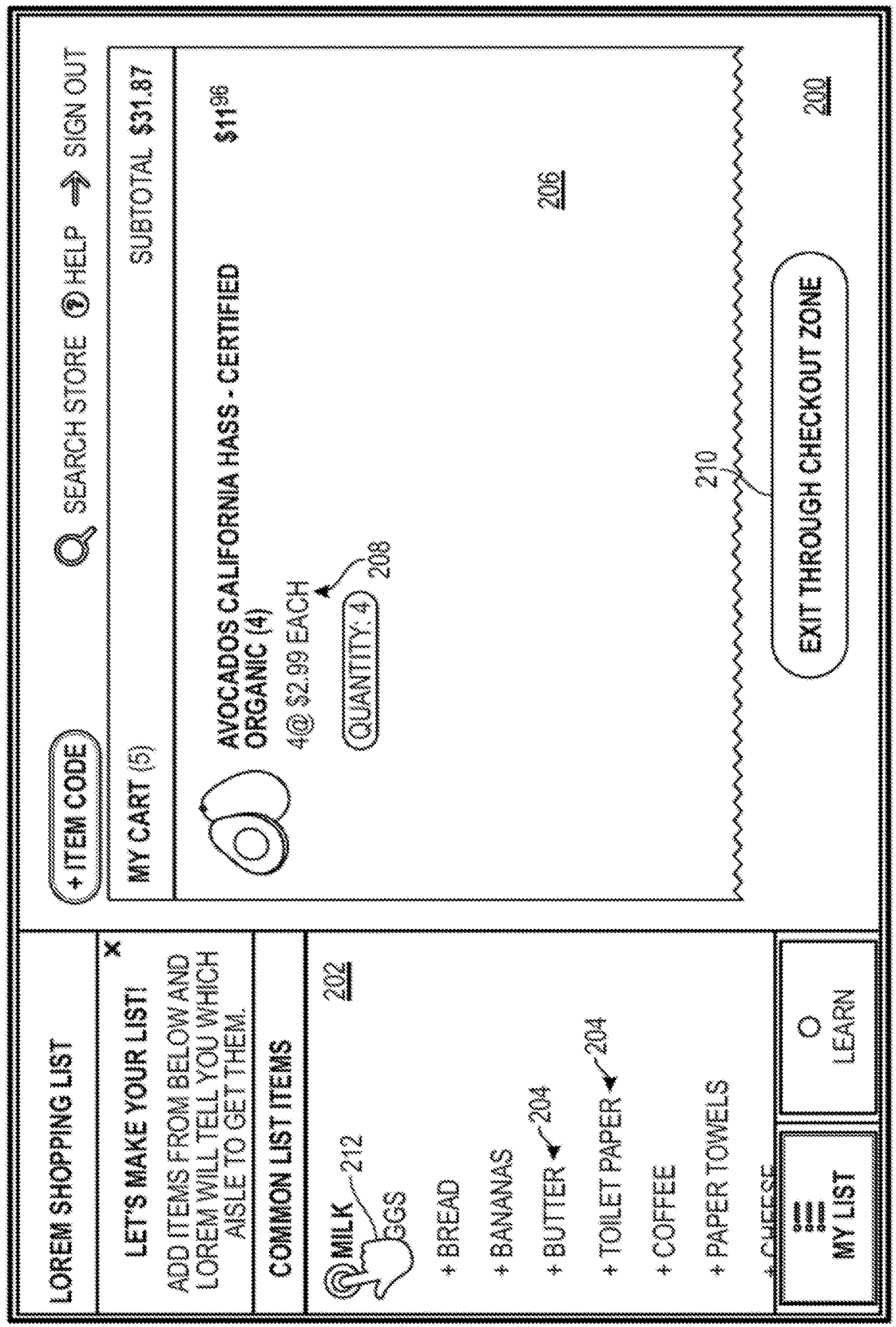
FIG. 2A illustrates an example user interface for a shopping list feature corresponding to adding a recommended keyword to a shopping list, in accordance with embodiments.
Figure 2B:
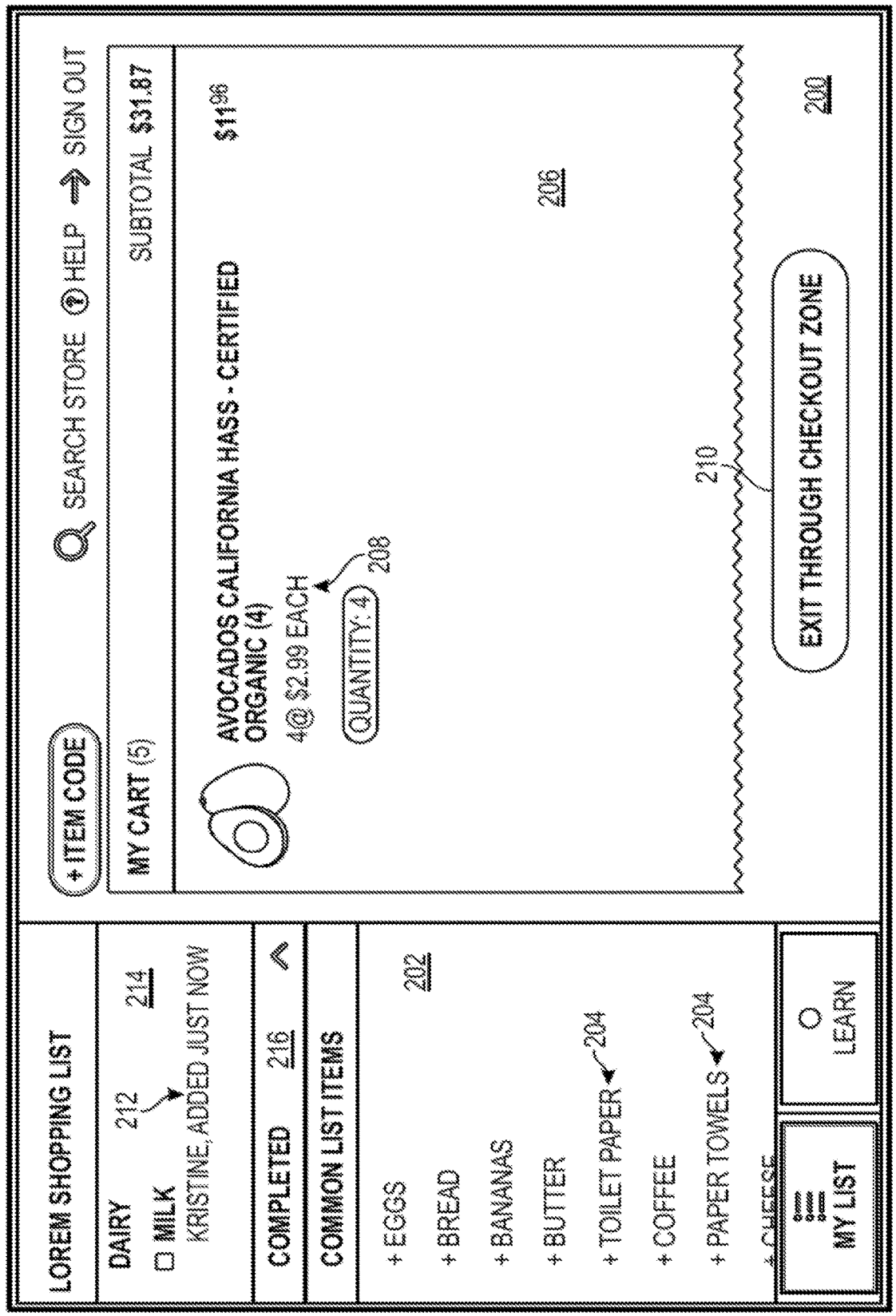
FIG. 2B illustrates an example user interface for a shopping list feature corresponding to adding a recommended keyword to a shopping list, in accordance with embodiments.

FIG. 2A illustrates an example user interface 200 for a shopping list feature corresponding to adding a recommended keyword to a shopping list, in accordance with embodiments. The user interface 200 includes a recommended keyword area 202 that further includes one or more recommended keywords 204, an area 206 for presenting item detail information 208 for an item added to a cart, and instructions 210 on how to pay for the items added to the cart. The user interface 200 also depicts input 212 provided by a user interacting with user interface 200 for adding one of the recommended keywords 204, "milk," to their shopping list. As illustrated in FIG. 2B, the user interface 200 may be updated to reflect that the user has added a particular keyword, 212, to their own shopping list.

The user interface 200 may be updated to present a first area 214 that corresponds to uncompleted tasks (e.g., items that have not been placed in the cart that correspond to a keyword on the shopping list), and a second area 216 that corresponds to completed tasks (e.g., items that have been placed in the cart that do correspond to a keyword on the shopping list). For example, were the user utilizing the shopping list displayed via user interface 200 to add soy milk to their cart, which would be reflected in area 206 (referred to as a third area of user interface 200), the milk keyword 212 may be moved from area 214 to area 216. By moving the keywords from an uncompleted tasks area (214) to a completed task area (216) of the user interface 200, the user may be visually reminded or indicated that an item that they intended to purchase on a current shopping journey has been obtained. The first area 214 of the user interface may also present information that indicates who added the keyword for an item ("Kristine") as well as a time period of when the item was added ("added just now") along with a determined category for the keyword ("Dairy"). The time period may correspond to an actual time such as "12:30 PM" along with a date such as "Apr. 20, 2020."

Figure 3:
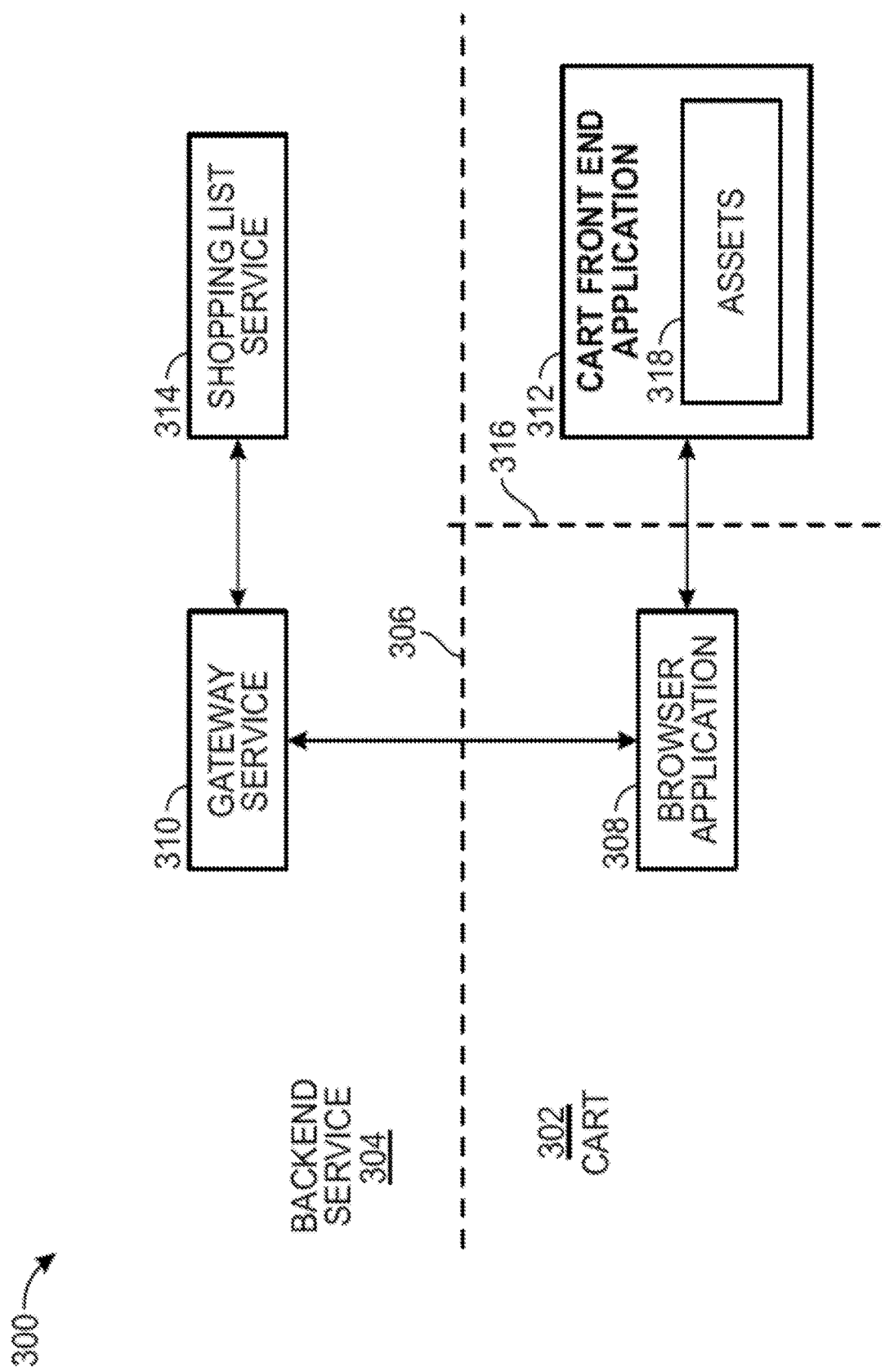
FIG. 3 depicts an illustrative example of a system or architecture in which techniques for implementing the shopping list feature may be implemented, in accordance with embodiments.

FIG. 3 depicts an illustrative example of a system or architecture 300 in which techniques for implementing the shopping list feature may be implemented, in accordance with embodiments. Architecture 300 of FIG. 3 includes a cart 302 portion and a backend service 304 portion that are in communication via one or more networks 306 including the Internet. In accordance with at least one embodiment, the cart 302 portion of the architecture 300 includes a browser application 308 in communication with a gateway service 310 of the backend service 304 and a cart front end application 312 of the cart 302 portion of architecture 300. In embodiments, the browser application 308 of the cart 302 portion and the gateway service 310 of the backend service 304 communicate via a Hyper Text Transfer Protocol Secure (HTTPS). The backend service 304 may include one or more services including at least shopping list service 314. It should be noted that although architecture 300 of FIG. 3 depicts gateway service 310 in communication with shopping list service 314 embodiments disclosed herein are not limited to communication with only a single service and instead multiple services for multiple purposes may be communicated with to implement the shopping list features described herein. For example, the gateway service 310 may be configured to communicate with a service for authenticating a user or user device, for conducting settlement and clearance of payments at the end of a shopping journey using payment credentials or payment information of a user, implementing a machine learning algorithm for mapping keywords to items and items to keywords, and generating representations of layouts for one or more stores.

In embodiments, the gateway service 310 and shopping list service 314 may be Coral services that communicate via a Cloud Authentication protocol. The browser application 308 may communicate with the cart front end application 312 via HTTPS. In embodiments, the cart 302 hardware may utilize a Linux operating system or other suitable operating system. The cart front end application 312 may be implemented using JavaScript and Hyper Text Markup Language (HTML) files based on an Angular framework. The browser application 308 may be another software application in the cart 302 which provides a user interface for a user to interact with according to the shopping list features described herein. The dashed line 316 represents the different environments that the software applications (browser application 308 and cart front end application 312) may communicate through via the Linux operation system or other suitable operating system of the cart 302. In accordance with at least one embodiment, the assets 318 may be one or more assets that are deployed with the hardware of cart 302 or updated via cart front end application 312 in communication with the browser application 308 and gateway service 310. The assets 318 may be utilized to generate one or more of the shopping list features described herein including at least user interface objects which are displayed and interacted with via browser application 308. In embodiments, at run time, the browser application 308 may load the front end application 312 to render the user interface that is displayed to a user.

Figure 4A:
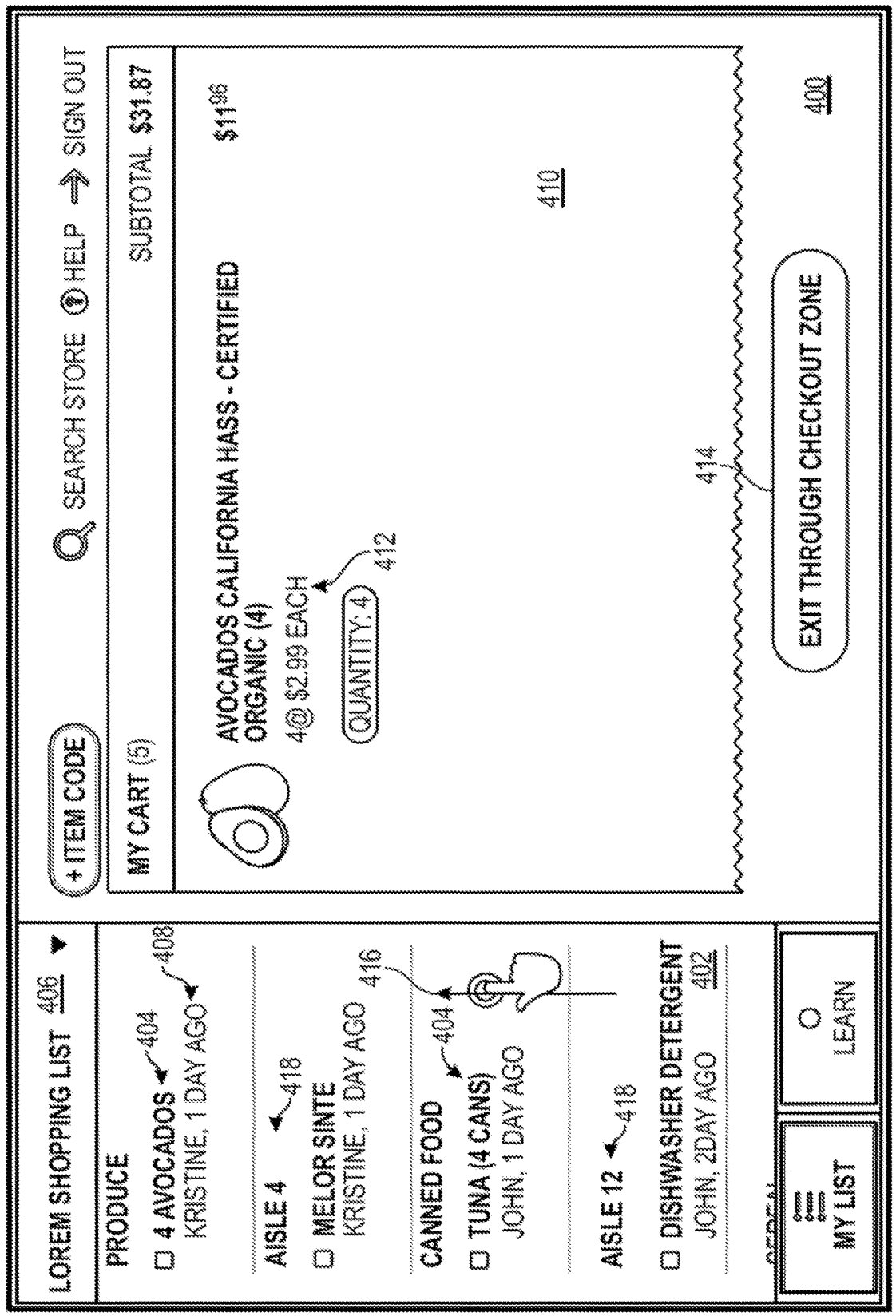
FIG. 4A illustrates an example user interface for a shopping list feature corresponding to an already generated shopping list, in accordance with embodiments.

FIG. 4A illustrates an example user interface 400 for a shopping list feature corresponding to an already generated shopping list, in accordance with embodiments. The user interface 400 includes an area 402 (sometimes referred to as a first area) that includes one or more keywords 404 of a shopping list generated by a user. The user interface 400 may include a designation 406 of who generated the shopping list that includes the one or more keywords 404 or who the shopping list is associated with. The first area 402 may display the one or more keywords 404 for the shopping list but also details 408 for the one or more keywords 404. For example, the details 408 may include an identification of which user added the particular keyword or item to the shopping list, when they added it to the shopping list, as well as an identification of where a corresponding item in the store that maps to the keyword may be located (e.g., "Produce, Aisle 6"). The area 402 of the user interface 400 that includes the one or more keywords 404 may be associated with uncompleted tasks for items corresponding to the one or more keywords 404 during a current shopping journey at a store.

The user interface 400 may include an area 410 for presenting item detail information 412 for an item added to a cart and instructions 414 on how to pay for the items added to the cart. The user interface 400 depicted in FIG. 4 also illustrates a user providing input 416 to scroll through the shopping list of one or more keywords 404 in area 402 of the user interface 400. The input 416 may be via an input/output device associated with the user interface, touch input on the user interface itself, or gesture input captured by a computer associated with the cart and user interface. The user interface 400 may display categories 418 for the keywords 404 in area 402 of the user interface 400. In accordance with at least one embodiment, the computer system implementing the shopping list feature may determine a category for a keyword as it is added to the shopping list by a user. The computer system may determine the category for the keyword based on a machine learning algorithm that is trained using the input from users as they add items to a cart and check off, mark, or otherwise indicate that a certain keyword corresponds to the item. The computer system may determine the category for the keyword based on categories of items maintained by the store or a pre-defined categorization of keywords maintained by the computer system. In accordance with at least one embodiment, the categories 418 may also correspond to locations for departments or specific aisles in a store that the user is currently shopping in. By displaying the categories 418 by department or aisle number, a user may more easily find an item that corresponds to the associated keyword. For example, "dishwasher detergent" may be located in "aisle 12" of a given store no matter the specific brand or item of dishwasher detergent. Another keyword, such as an "avocado" may be located in the "produce" department of the store. In embodiments, the computer system may determine a location of an item that corresponds to a keyword of the keywords 404 and update the area 402 to present locations (categories 418) within the store that correspond to the keywords 404.

Figure 4B:
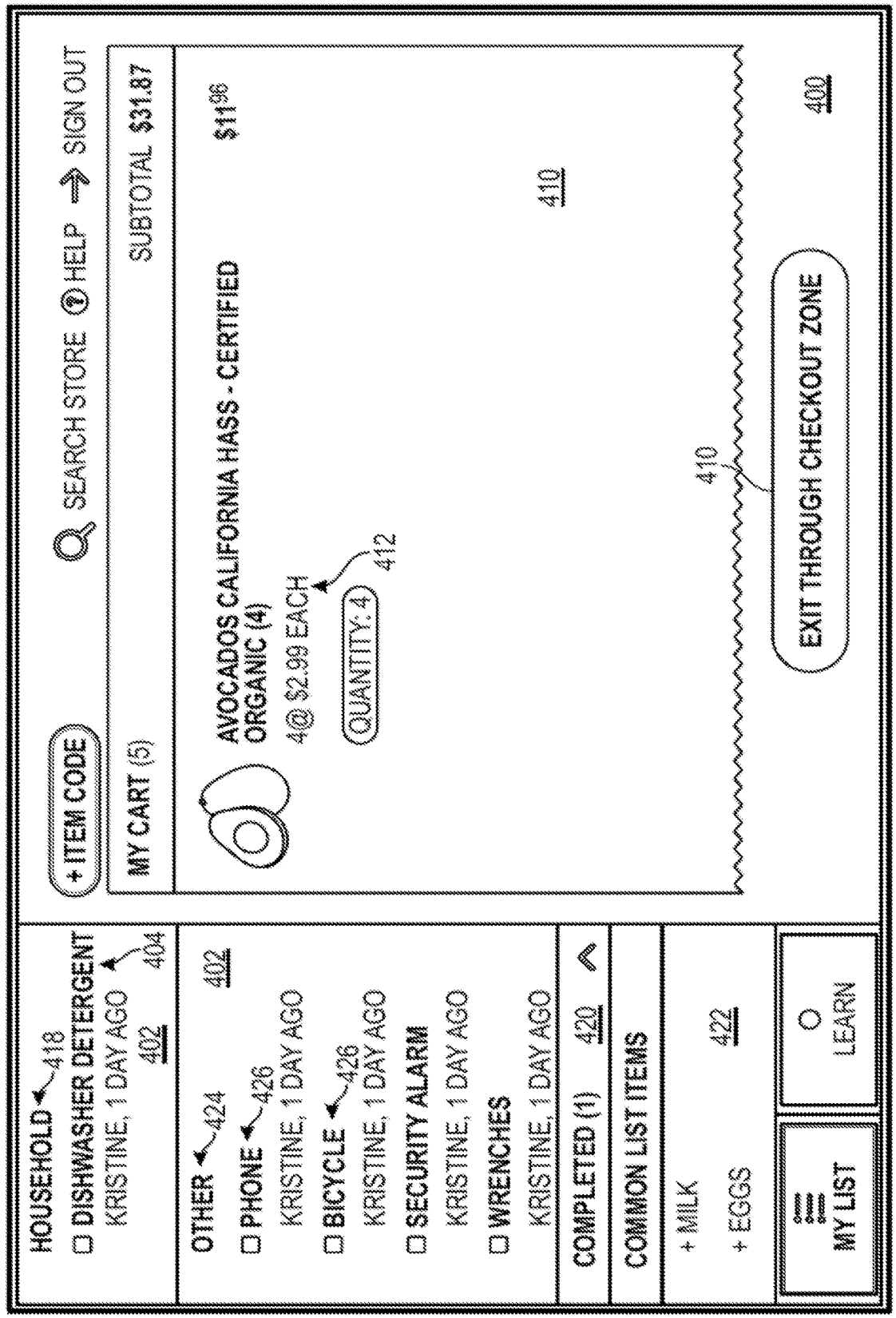
FIG. 4B illustrates an example user interface for a shopping list feature corresponding to categorizing keywords in a shopping list, in accordance with embodiments.

FIG. 4B illustrates an example user interface 400 for a shopping list feature corresponding to categorizing keywords in a shopping list, in accordance with embodiments. The user interface 400 of FIG. 4B shows a different state of the user interface 400 of FIG. 4A. The user interface 400 of FIG. 4B depicts a second area 420 that corresponds to completed tasks associated with the keywords 404 of the shopping list. User interface 400 of FIG. 4B also depicts a recommended keyword area 422 that may include one or more recommended keywords for a user to add to their shopping list dynamically as they browse or shop in a store as described in FIGS. 1A, 1B, 2A, and 2B. As described with reference to FIG. 4A, the user interface 400 may include one or more categories 418 for a keyword such as keyword 404. The computer system may designate an other category 424 for keywords 426 that are unrecognized by the system. In embodiments, as the machine learning algorithm implemented by the computer system is trained using input and data from users interacting with items and keywords, the keywords 426 may be re-categorized into one or more known categories.

Figure 4C:
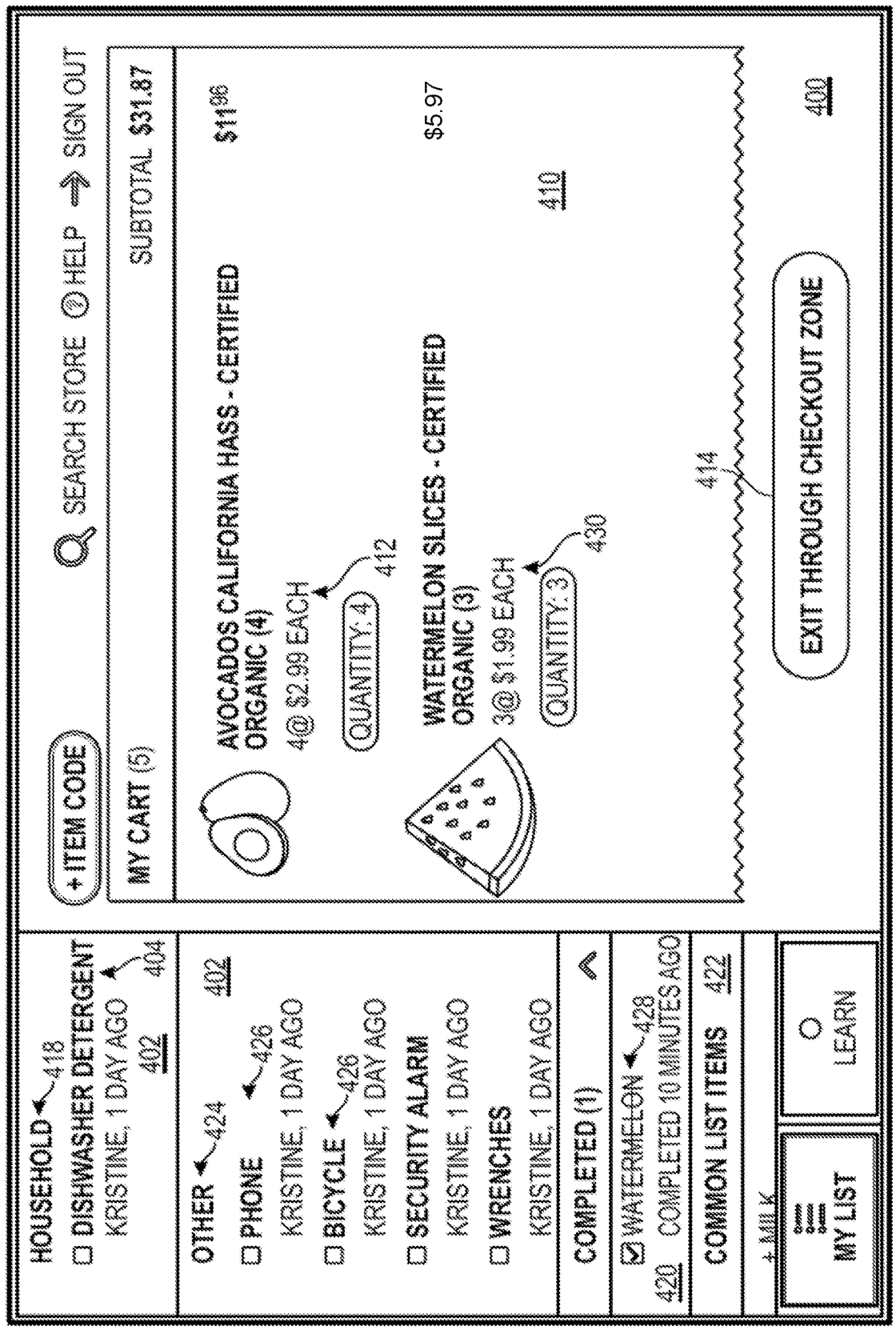
FIG. 4C illustrates an example user interface for a shopping list feature corresponding to updating the user interface to indicate a completed task for an item that corresponds to a keyword, in accordance with embodiments.

FIG. 4C illustrates an example user interface 400 for a shopping list feature corresponding to updating the user interface to indicate a completed task for an item that corresponds to a keyword, in accordance with embodiments. The user interface 400 of FIG. 4C shows a different or updated state of the user interface 400 of FIGS. 4A and 4B. The user interface 400 of FIG. 4B depicts the second area 420 updated to reflect a completed task 428 that corresponds to a user adding an item to the cart. The area 410 (which may be referred to as a third area) may be updated to reflect an item added to the cart such as by displaying item details 430 for the newly added item "WATERMELON SLICES." In embodiments, the item details 430 are based on sensors of the cart associated with the computer system interacting with the item as the user places the item in the cart. For example, the sensors may be configured to scan, read, or capture images of the item as the user places the item in the cart which generates information that is transmitted to a computer system for identifying the item and generating the item details 412 and 430.

In accordance with at least one embodiment, if the user removes the item, such as the item corresponding to item details 430, from the cart, then the user interface 400 may be updated to remove the item details 430 from the cart. In embodiments, a user may interact with user interface 400 upon placing an item in the cart to update a keyword to move it from the area 402, associated with uncompleted tasks, to area 420, associated with completed tasks. In embodiments, the user may be queried or prompted to verify that the item just added to the cart corresponds to the keyword they are subsequently interacting with or moving from the area 402 to 420. The input provided by the user interacting with the user interface 400 may be provided to a computer system and be utilized by an implemented machine learning algorithm to map keywords of a shopping list to specific items offered by a store and items offered by a store to keywords of a shopping list. In accordance with at least one embodiment, the mapping and determinations performed by the machine learning algorithm may be specific or personalized to a particular user such that automatic substitutions may be performed as a user adds a keyword to a shopping list. For example, the user interface may be updated to add "watermelon slices" instead of "watermelon" as the user continues to provide input about their shopping habits and items selected when certain keywords are added to a shopping list. In embodiments, the machine learning algorithm may utilize aggregated information and input provided by a plurality of users interacting with the user interface and adding items to their cart to determine keyword to item mapping and item to keyword mapping for use in the shopping list features described herein.

Figure 5A:
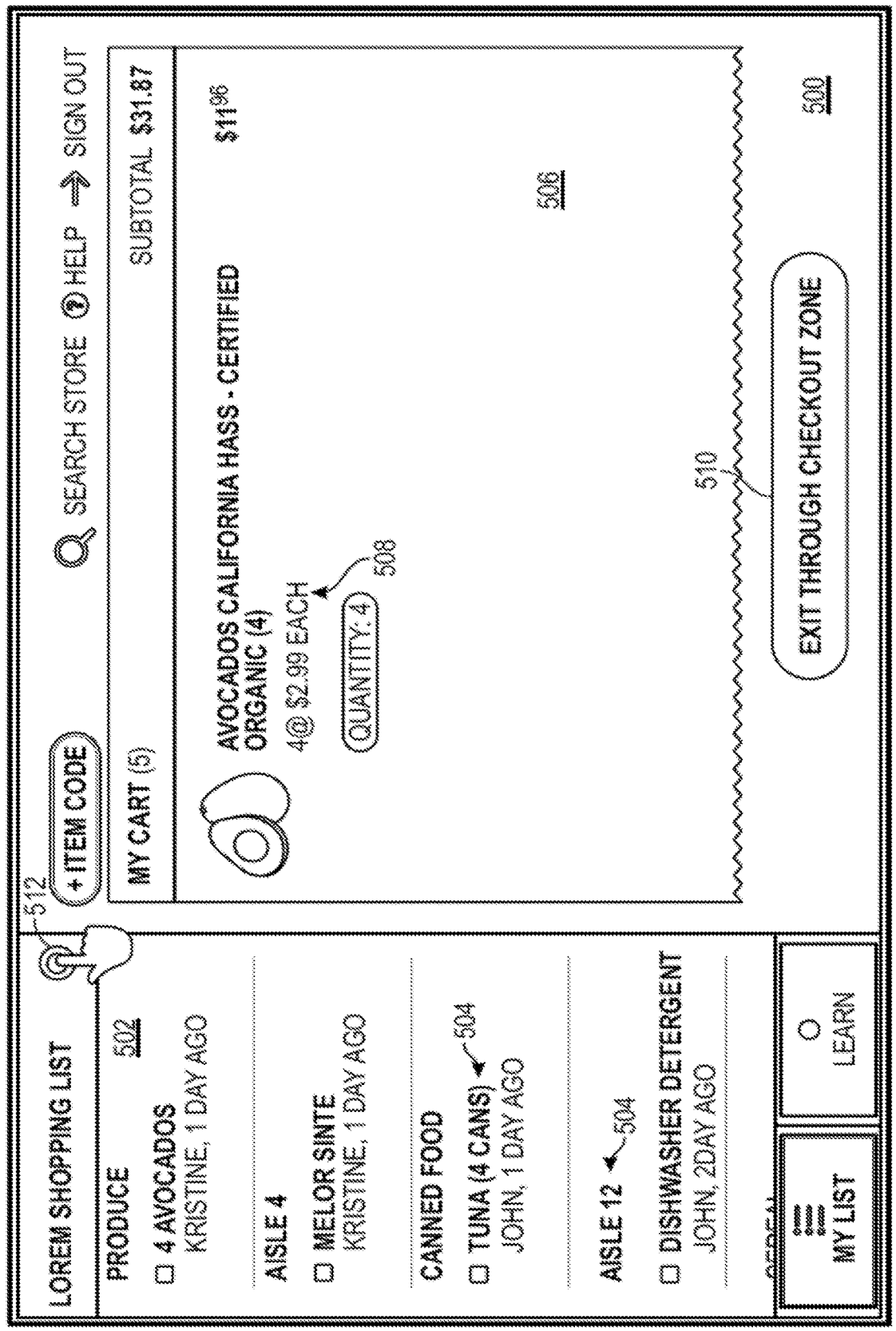
FIG. 5A illustrates an example user interface for a shopping list feature corresponding to selecting a custom shopping list, in accordance with embodiments.

FIG. 5A illustrates an example user interface 500 for a shopping list feature corresponding to selecting a custom shopping list, in accordance with embodiments. The user interface 500 includes an area 502 with one or more keywords 504 of a shopping list. The area 502 may correspond to a first area of the user interface. The user interface 500 may include an area 506 (which may be referred to as a third area) that is updated as a user places an item in a cart of the computer system implementing the user interface 500. The area 506 may display item detail information 508 for an item added to the cart that corresponds to one of the keywords 504 of the shopping list. The user interface 500 may include instructions 510 on how to pay for the items added to the cart. In accordance with at least one embodiment, a user may interact with the user interface 500 to provide input 512 for selecting a custom shopping list. In embodiments, a custom shopping list may be a shopping list generated by the user, imported from another user or entity, and include items that are associated with a particular store or event as illustrated in FIGS. 5B-5D.

Figure 5B:
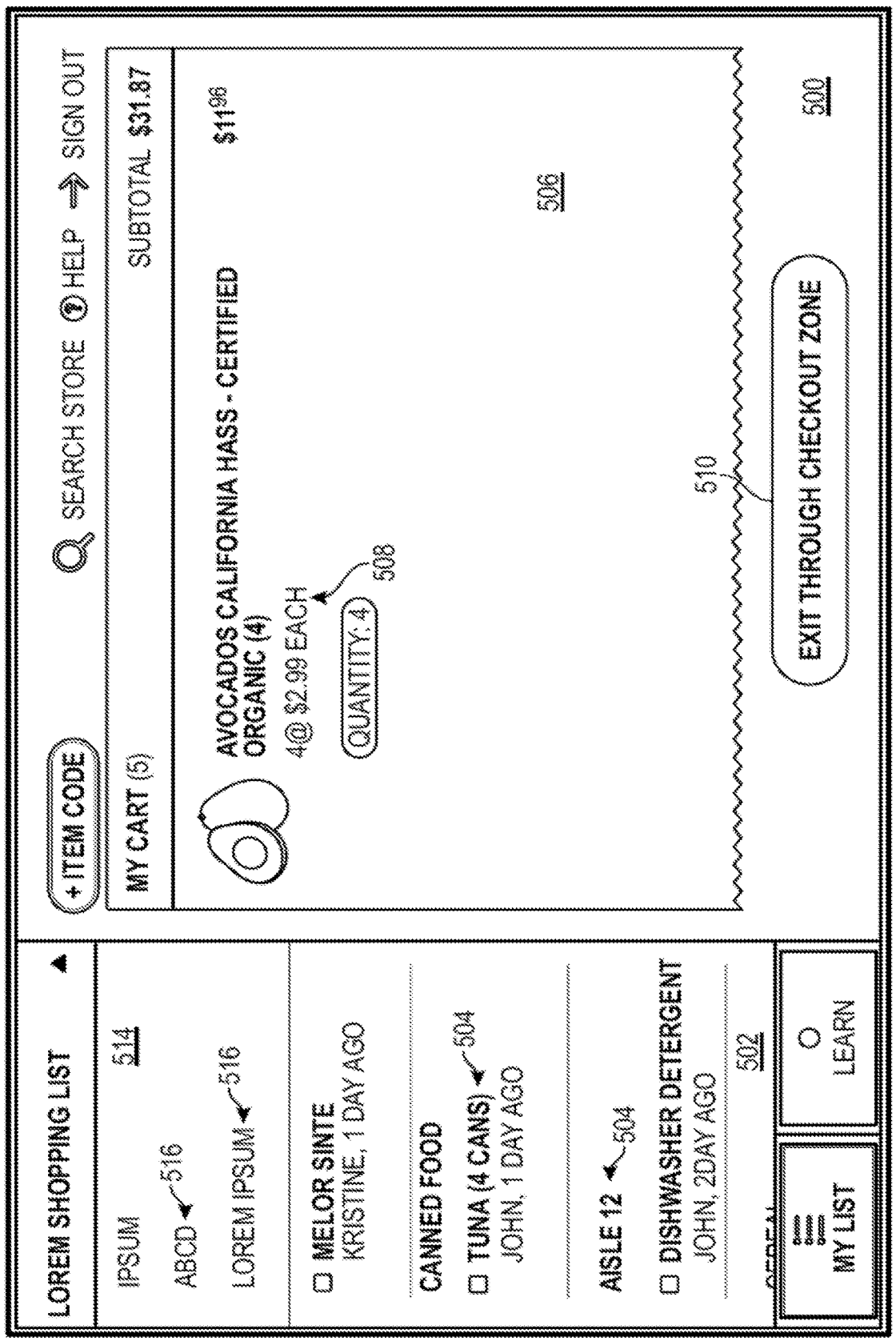
FIG. 5B illustrates an example user interface for a shopping list feature corresponding to selecting a custom shopping list, in accordance with embodiments.

FIG. 5B illustrates an example user interface 500 for a shopping list feature corresponding to selecting a custom shopping list, in accordance with embodiments. The user interface 500 of FIG. 5B may include an update to the user interface 500 of FIG. 5A which displays an area 514 that presents one or more labels 516 that correspond to different custom shopping lists. For example, one custom shopping list may be associated with a particular branch of a popular grocery store that focuses on organic brands. Another custom shopping list may be associated with an event such as the "Super Bowl." The one or more labels 516 that correspond to the custom shopping lists may be generated by the user and may be descriptive of the associated shopping list such as "Birthday Party Shopping List."

Figure 5C:
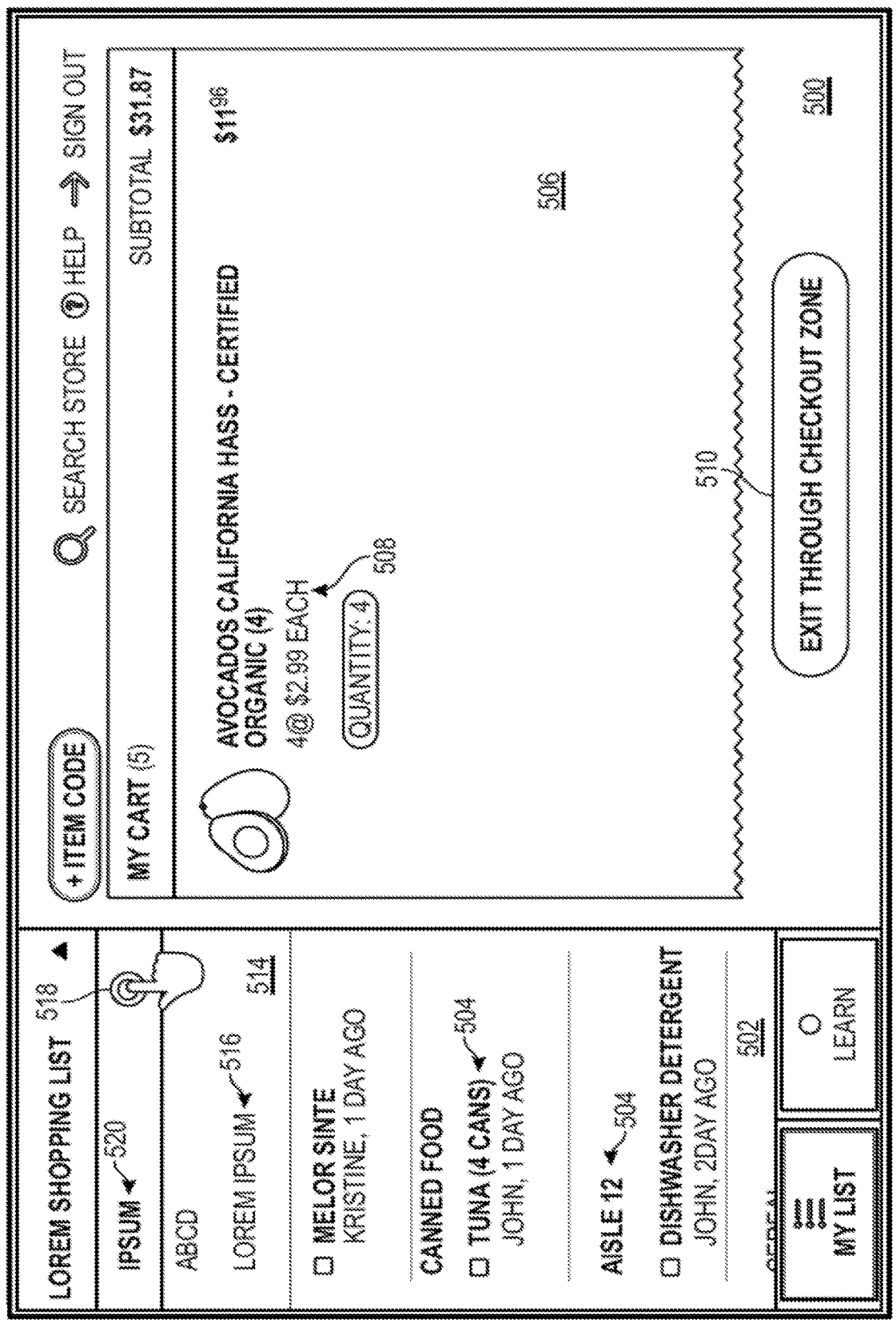
FIG. 5C illustrates an example user interface for a shopping list feature corresponding to selecting a custom shopping list, in accordance with embodiments.

FIG. 5C illustrates an example user interface 500 for a shopping list feature corresponding to selecting a custom shopping list, in accordance with embodiments. The user interface 500 of FIG. 5C may include an update to the user interface 500 of FIG. 5B which depicts a user providing input 518 for selecting a particular custom shopping list 520. The particular custom shopping list 520 may be one of the custom shopping lists displayed in area 514 of the user interface 500.

Figure 5D:
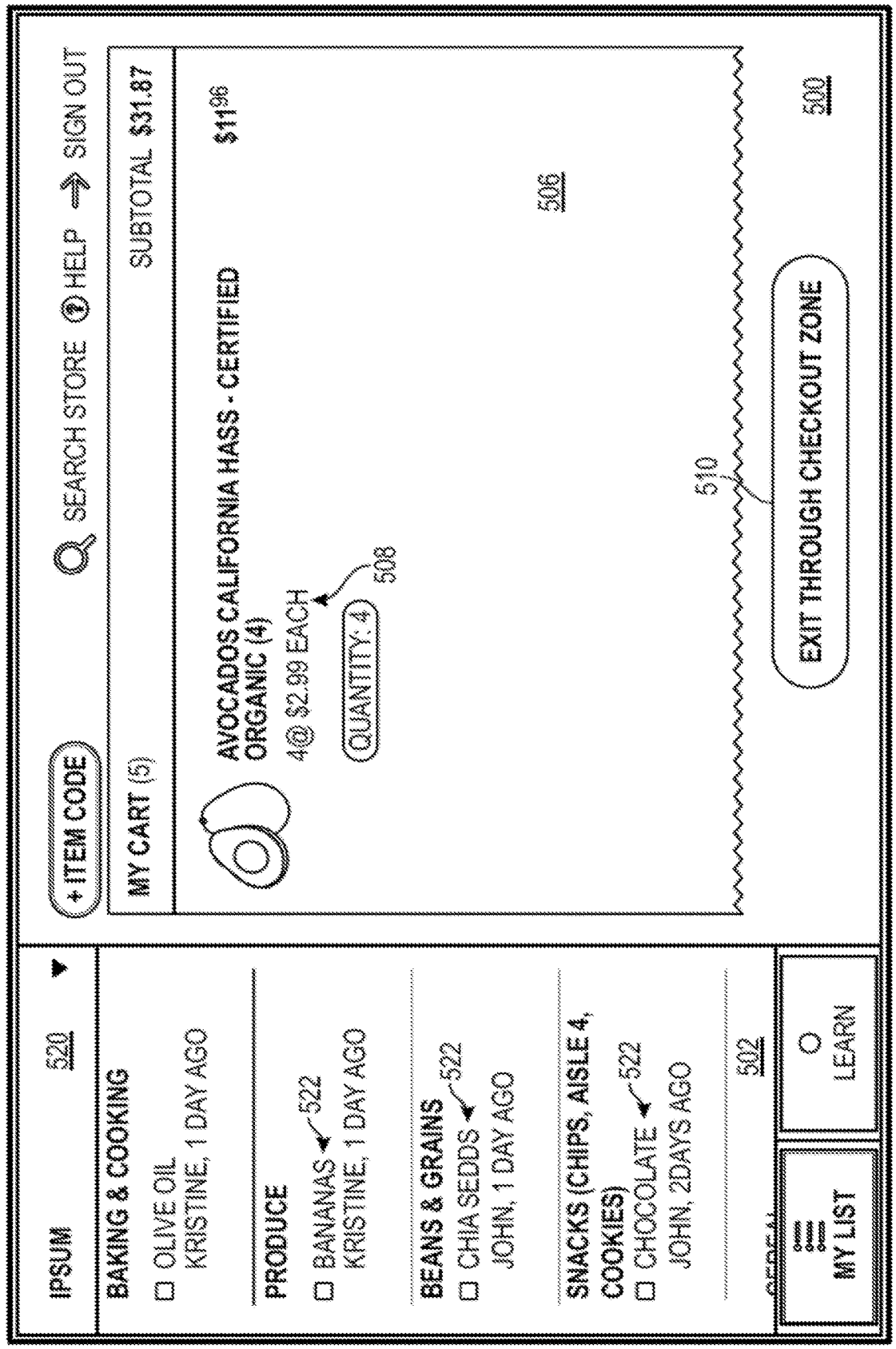
FIG. 5D illustrates an example user interface for a shopping list feature corresponding to updating the user interface in response to a selection of a custom shopping list, in accordance with embodiments.

FIG. 5D illustrates an example user interface 500 for a shopping list feature corresponding to updating the user interface in response to a selection of a custom shopping list, in accordance with embodiments. The user interface 500 of FIG. FD may depict an update to the user interface 500 of FIG. 5C which displays keywords 522 in area 502 in response to the user selecting the particular custom shopping list 520. The keywords 522 in area 502 are different than the keywords 504 of FIGS. 5A, 5B, and 5C. The keywords 522 may still provide information identifying an entity that added the keyword to the shopping list, when they added the keyword to the shopping list, and a location where a corresponding item in the current store may be located. In embodiments, the user interface 500 may update to present different keywords as the user selects different custom shopping lists that contain different keywords. If a keyword is common to one or more custom shopping lists than the keyword may persist being displayed in area 502. As described herein, once a user has selected a shopping list, added an item to the cart, and interacted with the user interface to mark a particular keyword associated with the item, the input and information about the keyword and item may be provided to a computer system for training a machine learning algorithm. The computer system may provide other features such as replacing keywords with specific items, generate routes for completing a shopping journey, or recommend items for subsequent shopping journeys and for other users to utilize.

Figure 6A:
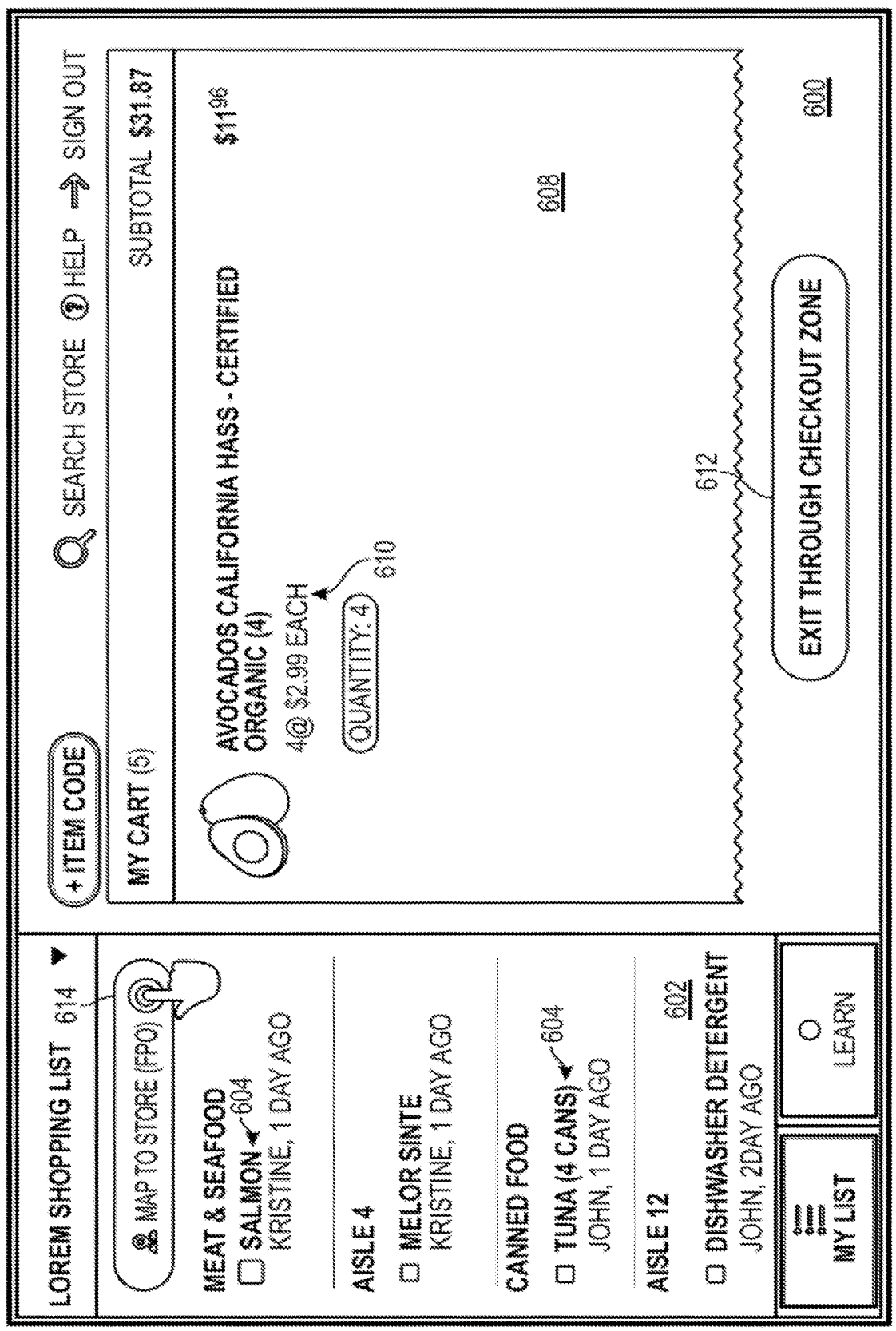
FIG. 6A illustrates an example user interface for a shopping list feature corresponding to mapping locations of items on a shopping list to a representation of a store layout, in accordance with embodiments.

FIG. 6A illustrates an example user interface 600 for a shopping list feature corresponding to mapping locations of items on a shopping list to a representation of a store layout, in accordance with embodiments. The user interface 600 includes an area 602 (sometimes referred to as a first area) that includes one or more keywords 604 of a shopping list generated by a user. The user interface 600 may include a designation 606 of who generated the shopping list that includes the one or more keywords 604 or who the shopping list is associated with. The first area 602 may display the one or more keywords 604 for the shopping list and details for the one or more keywords 604. For example, the details may include an identification of which user added the particular keyword or item to the shopping list, when they added it to the shopping list, as well as an identification of where a corresponding item in the store that maps to the keyword may be located (e.g., "SEAFOOD, Aisle 9, Aisle 14").

The area 602 of the user interface 600 that includes the one or more keywords 604 may be associated with uncompleted tasks for items corresponding to the one or more keywords 604 during a current shopping journey at a store. The user interface 600 may include an area 608 for presenting item detail information 610 for an item added to a cart and instructions 612 on how to pay for the items added to the cart. The user interface 600 may include an option or display, via the user interface 600, a feature 614 for mapping keywords to locations in a representation of a layout of the store that the user is shopping at for a current shopping journey. In embodiments, a user may interact with the user interface 600 to select feature 614 such as by providing input. The input may be provided via an input/output device of the cart, the computer system associated with the cart, or may be provided via touch input or gesture input obtained by the user interface and/or computer system of the cart.

Figure 6B:
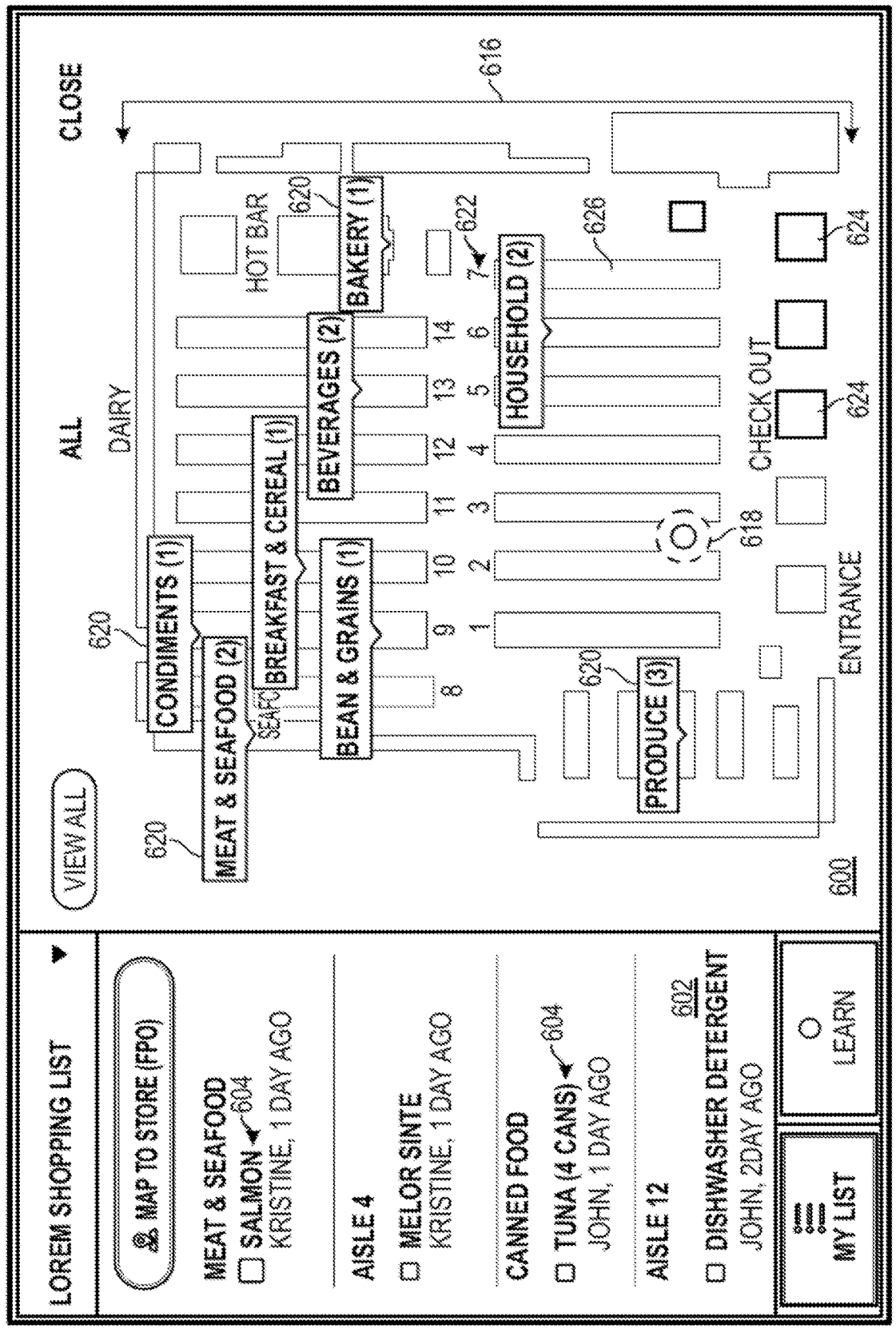
FIG. 6B illustrates an example user interface for a shopping list feature corresponding to updating the user interface to display locations of items on a shopping list in a representation of a store layout, in accordance with embodiments.

FIG. 6B illustrates an example user interface 600 for a shopping list feature corresponding to updating the user interface to display locations of items on a shopping list in a representation of a store layout, in accordance with embodiments. The user interface 600 if FIG. 6B may depict an update of user interface 600 of FIG. 6A in response to the user selecting the feature 614 to map keywords of the shopping list to a representation of a layout of a store that corresponds to the user's current location or the current location of the computer system and/or cart associated with the user. The user interface 600 of FIG. 6B may be updated to display a representation of a layout 616 of a current store that corresponds to the user's location or a computer system and/or cart that the user is utilizing during a shopping journey at a store. In embodiments, a layout of a store may refer to a visual representation of different features, locations, and other information that can be visually communicated to a user about a store.

The user interface 600 of FIG. 6B may display the layout 616 of a store that includes a current location of the user or their cart 618, locations of various categories 620 that correspond to the categories for the keywords 604 of their shopping list, designations to aid a user in traveling through the store such as designations for aisles 622, registers 624, and shelves 626. The locations of categories 620 may update to include more indicators on the layout 616 of user interface 600 as a user adds more keywords 604 to the shopping list or it may update to reduce indicators on the layout 616 of the categories 620 in response to the user completing tasks related to the keywords 604 by placing items in their cart and interacting with the user interface. Completion of tasks can include a user providing input to move the keyword from a first area (602) associated with uncompleted tasks to another area (second area) that corresponds to completed tasks. The information of items and keywords as well as the input provided by the user may be provided to a computer system for training a machine learning algorithm. The user interface 600 of FIG. 6B may also include indications for checkout lanes (not pictured) that correspond to registers 624 as well as zones (not pictured) for returning carts. The registers 624 may be located in a check out area of the store as indicated in user interface 600.

Figure 6C:
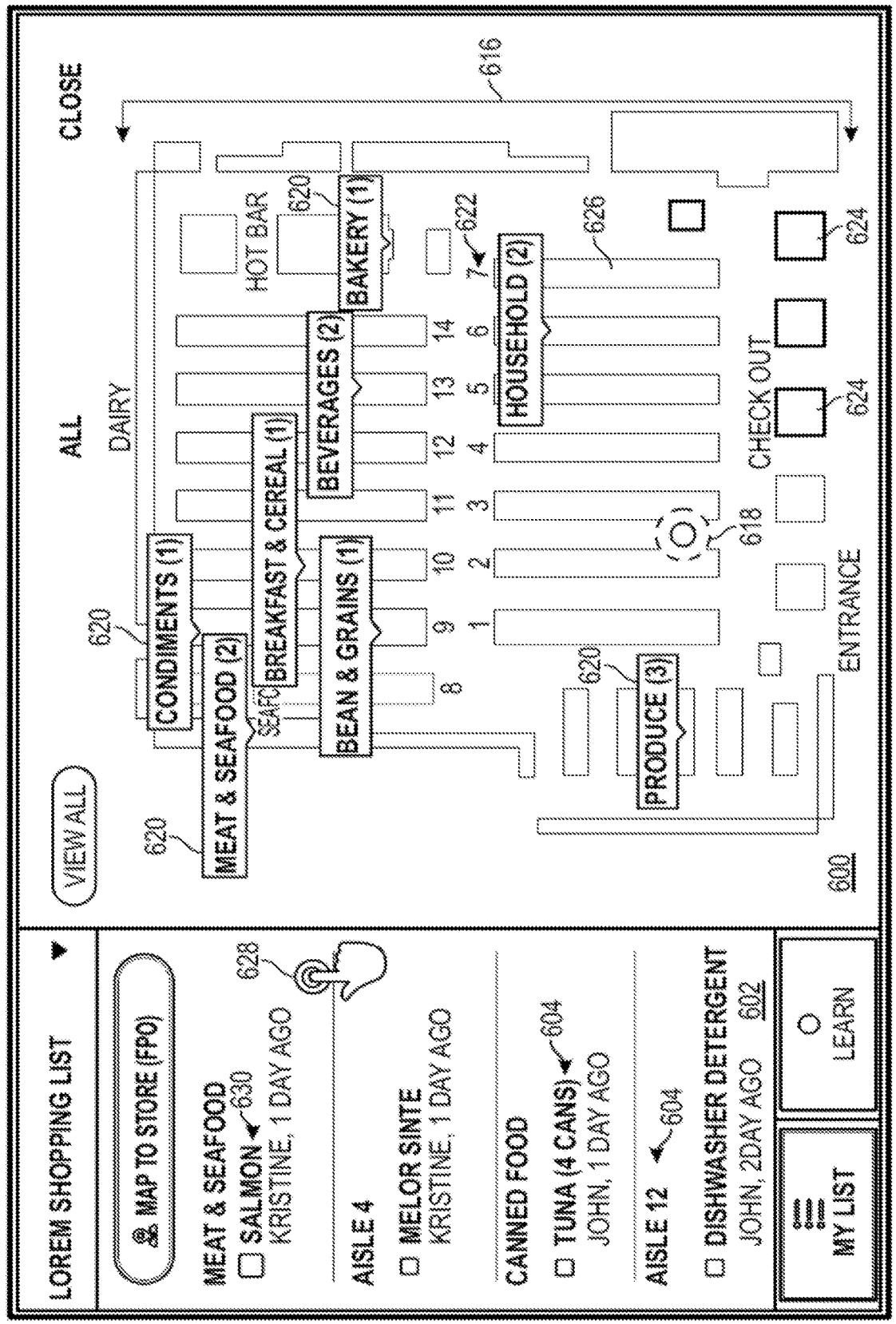
FIG. 6C illustrates an example user interface for a shopping list feature corresponding to updating the user interface to display locations of a specific item on a shopping list in a representation of a store layout, in accordance with embodiments.

FIG. 6C illustrates an example user interface 600 for a shopping list feature corresponding to updating the user interface to display locations of a specific item on a shopping list in a representation of a store layout, in accordance with embodiments. The user interface 600 of FIG. 6C may be similar to the user interface 600 of FIG. 6B with the added depiction of a user providing input 628 to map a specific keyword 630 to the layout 616 of the store in the user interface 600. For example, the user may provide input 628 to update the user interface 600 to map the specific keyword 630 ("Salmon") to the layout 616 of the store.

Figure 6D:
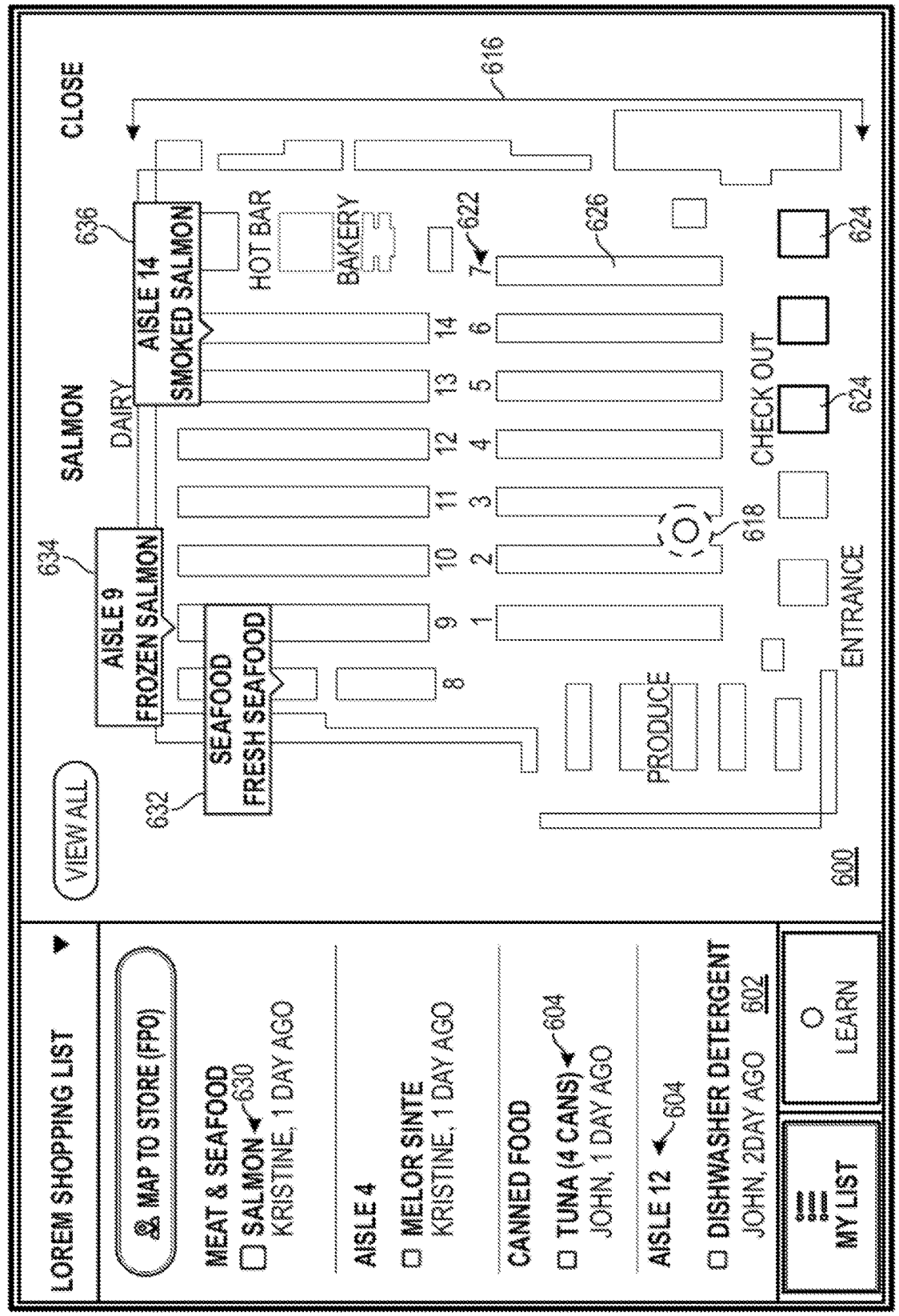
FIG. 6D illustrates an example user interface for a shopping list feature corresponding to updating the user interface to display locations of a specific item on a shopping list in a representation of a store layout, in accordance with embodiments.

FIG. 6D illustrates an example user interface 600 for a shopping list feature corresponding to updating the user interface to display locations of a specific item on a shopping list in a representation of a store layout, in accordance with embodiments. The user interface 600 of FIG. 6D may depict an update of user interface 600 of FIG. 6C in response to the user selecting the particular keyword 630. The user interface 600 of FIG. 6D is updated to remove indications of categories 620 as they are unrelated to the particular keyword 630. Instead, the user interface 600 of FIG. 6D is updated to present categories that are relevant including indications 632, 634, and 636. As the keyword is "Salmon" for particular keyword 630 may be associated with different types or styles, the user interface 600 provides information for three different possibilities for the location of the item that the user is looking for within the representation of the layout 616 for the store.

In embodiments, as the computer system learns from information regarding mapping of keywords to items and items to keywords and input from users interacting with user interfaces, the machine learning algorithm may be able to predict a particular category or specific item that the user desires when they add the particular keyword 630 in their shopping list for subsequent shopping journeys. The machine learning algorithm can also utilize past purchase history of the user, location information, and other data points to predict the particular category of specific item that is associated with a keyword of a shopping list provided by a user. As an illustrative example, the user interacting with user interface 600 may also add fresh salmon filets from the category 632 during a number of shopping journeys when they have the keyword salmon on their shopping list (630). Thereafter, the computer system may predict this association and only display the location for "FRESH SEAFOOD" on the representation of the layout for the store during subsequent shopping journeys.

Figure 6E:
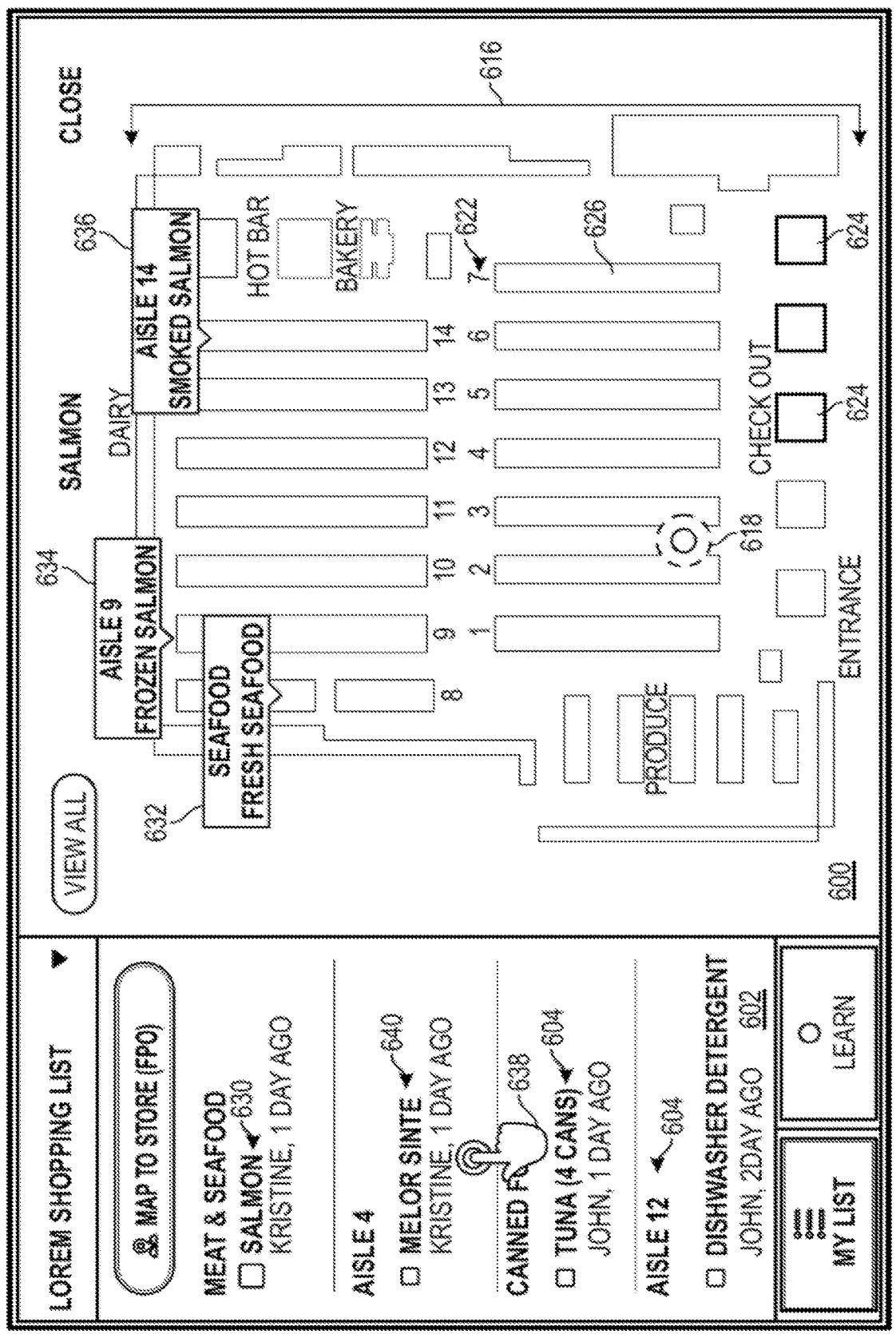
FIG. 6E illustrates an example user interface for a shopping list feature corresponding to updating the user interface to display locations of a different item on a shopping list in a representation of a store layout, in accordance with embodiments.

FIG. 6E illustrates an example user interface 600 for a shopping list feature corresponding to updating the user interface to display locations of a different item on a shopping list in a representation of a store layout, in accordance with embodiments. The user interface 600 of FIG. 6E depicts a user providing input 638 for selecting another particular keyword 640 to map to the representation of the layout 616 of the store from the previous particular keyword 630. By selecting another keyword, the user interface 600 may be updated, as described below with reference to FIG. 6F, to remove indications of categories 632, 634, and 636 as they do not correspond to keyword 640.

Figure 6F:
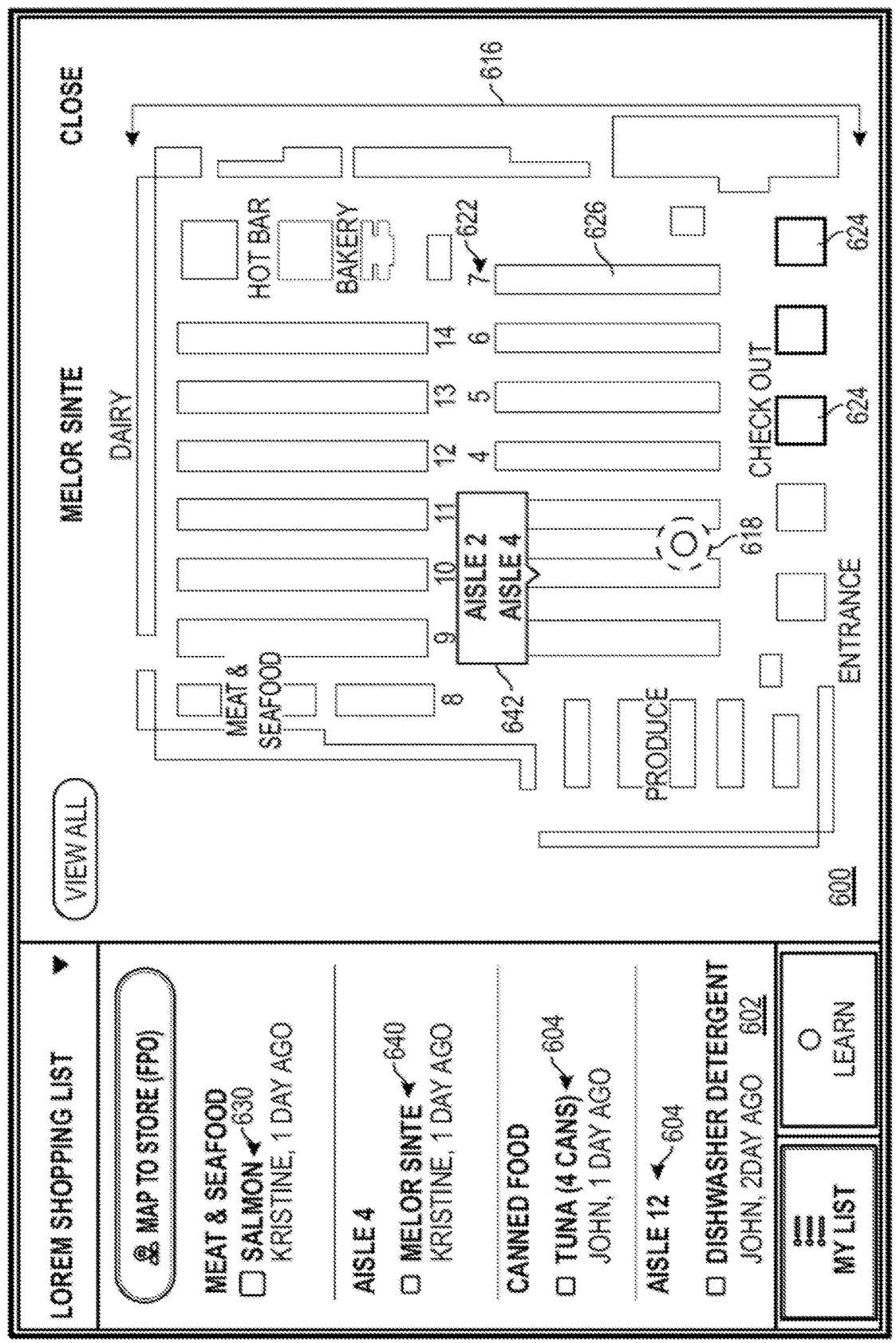
FIG. 6F illustrates an example user interface for a shopping list feature corresponding to updating the user interface to display locations of a different item on a shopping list in a representation of a store layout, in accordance with embodiments.

FIG. 6F illustrates an example user interface 600 for a shopping list feature corresponding to updating the user interface to display locations of a different item on a shopping list in a representation of a store layout, in accordance with embodiments. The user interface 600 of FIG. 6F may be an update of user interface 600 in response to input 638 for particular keyword 640 of the shopping list. The user interface 600 of FIG. 6F has updated the indications of categories to include 642 to correspond to the selected particular keyword 640. In accordance with at least one embodiment, the computer system implementing the user interface 600 may be configured to generate a route to obtain the items that correspond to the keywords, 604, 630, and 640 of the shopping list in an efficient manner that can guide the user as they shop in the store that corresponds to the representation of the layout 616. In embodiments, the route may be determined by the computer system based on the keywords 604, 630, and 640 of the shopping list, the locations of categories or specific items in a store, and other information such as a current location of the user 618 or the cart associated with the user. The route generated by the computer system may be generated based at least in part on the order of the items historically added to a user's cart during a shopping journey. In accordance with at least one embodiment, the computer system may be configured to update or change the presentation of order of the keywords 604, 630, and 640 in area 602 of the user interface based on the user's current location 618 in the store and the location of categories of items that are in close proximity to the user's current location 618. The order of presentation of the keywords 604, 630, and 640 may be updated based at least in part on the order of items that correspond to the keywords 604, 630, and 640 are historically added to the cart by the user. The order of presentation of the keywords 604, 630, and 640 may be updated in accordance with a determined route that the computer system has generated for the user. The routes generated by the computer system (not pictured) may be indicated in the representation of the layout 616 in user interface 600.

Figure 7:
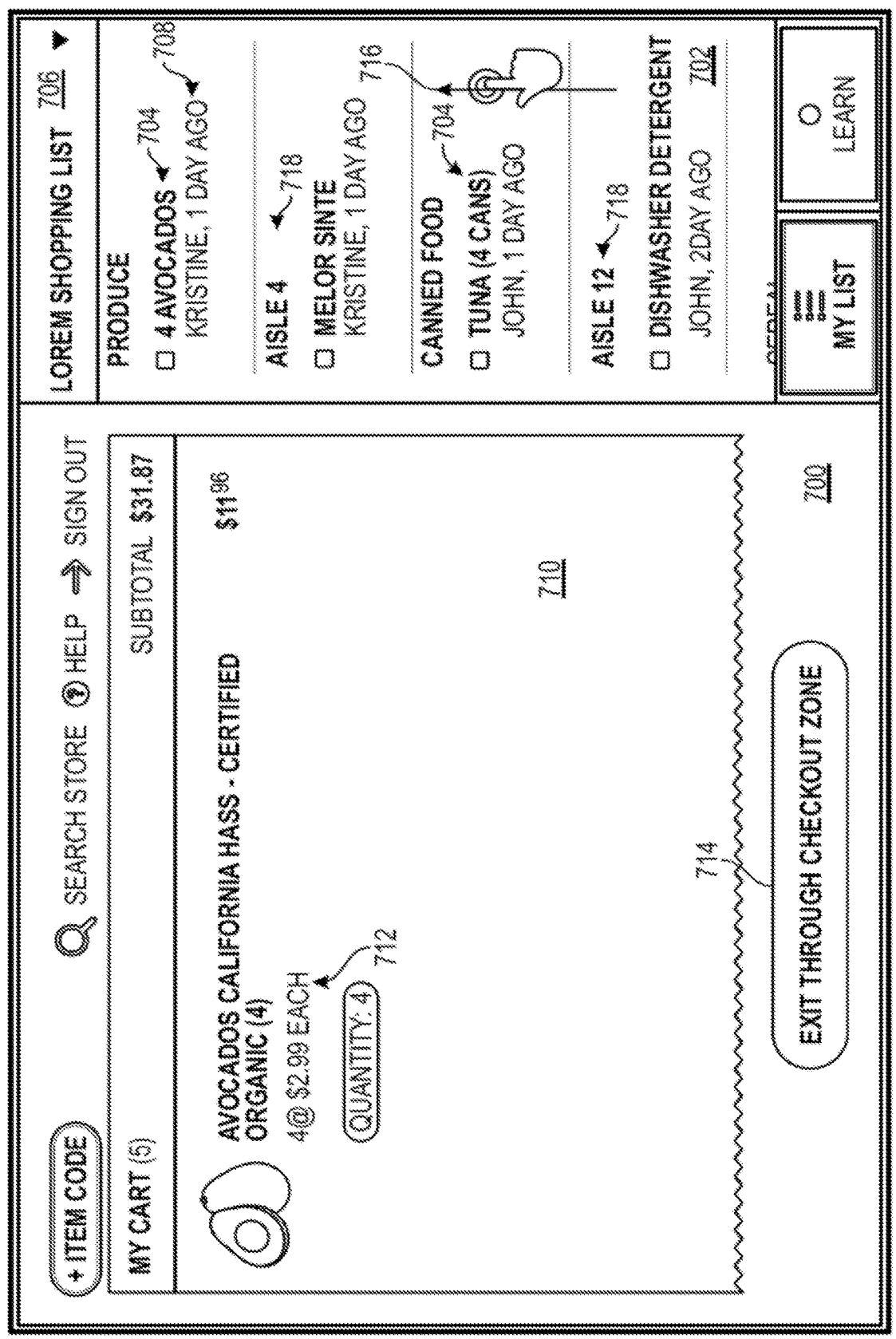
FIG. 7 illustrates an example user interface for a shopping list feature corresponding to an already generated shopping list, in accordance with embodiments.

FIG. 7 illustrates an example user interface 700 for a shopping list feature corresponding to an already generated shopping list, in accordance with embodiments. The user interface 700 includes an area 702 (sometimes referred to as a first area) that includes one or more keywords 704 of a shopping list generated by a user. The user interface 700 may include a designation 706 of who generated the shopping list that includes the one or more keywords 704 or who the shopping list is associated with. The first area 702 may display the one or more keywords 704 for the shopping list and details 708 for the one or more keywords 704. For example, similar to the details 408 of FIG. 4A, the details 708 may include an identification of which user added the particular keyword or item to the shopping list, when they added it to the shopping list. The area 702 of the user interface 700 that includes the one or more keywords 704 may be associated with uncompleted tasks for items corresponding to the one or more keywords 704 during a current shopping journey at a store.

The user interface 700 may include an area 710 for presenting item detail information 712 for an item added to a cart and instructions 714 on how to pay for the items added to the cart. The user interface 700 depicted in FIG. 7 also illustrates a user providing input 716 to scroll through the shopping list of one or more keywords 704 in area 702 of the user interface 700. The user interface 700 may display locations 718 for the keywords 704 in area 702 of the user interface 700. The locations 718 may correspond to areas of a store that the user is shopping in where the an item, a category of item, or items can be located that correspond to the associated keyword. Although FIG. 7 illustrates the area 702 displayed to the right of area 710 whereas FIG. 4 illustrates the area 402 to the left of area 410 the embodiments described herein should not be limited to any particular configuration. In embodiments, the user interface displayed or presented via a computer system may utilize any suitable configuration of areas, icons, interface elements, or other data objects to convey information about a shopping list, incomplete tasks, completed tasks, payment instructions, or locations in a store in accordance with the shopping list feature described herein.

Figure 8:
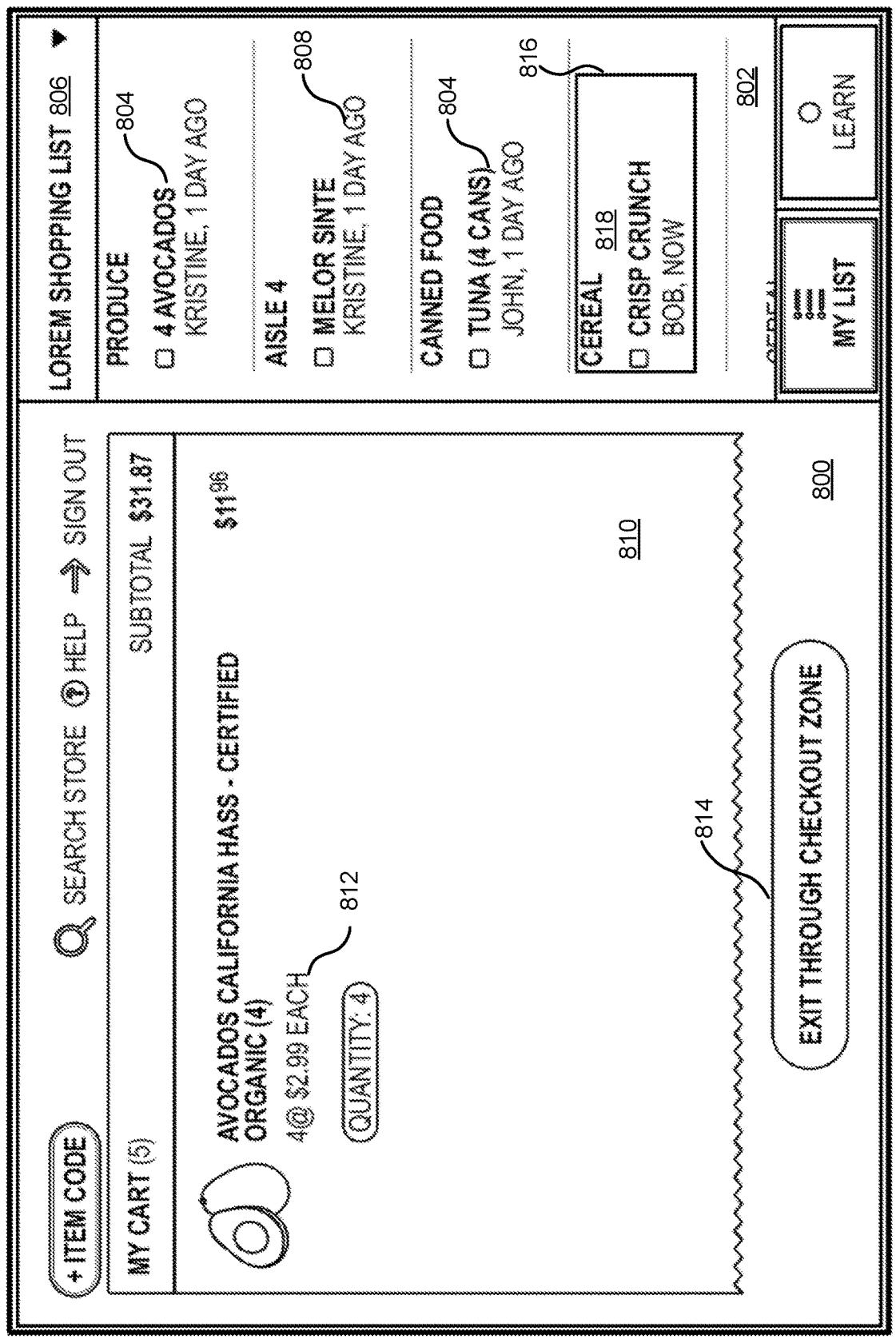
FIG. 8 illustrates an example user interface for a shopping list feature corresponding to an already generated shopping list that is dynamically updated with a new keyword, in accordance with embodiments.

FIG. 8 illustrates an example user interface 800 for a shopping list feature corresponding to an already generated shopping list that is dynamically updated with a new keyword, in accordance with embodiments. The user interface 800 includes an area 802 (sometimes referred to as a first area) that includes one or more keywords 804 of a shopping list generated by a user. The user interface 800 may include a designation 806 of who generated the shopping list that includes the one or more keywords 804 or who the shopping list is associated with. The first area 802 may display the one or more keywords 804 for the shopping list and details 808 for the one or more keywords 804. The area 802 of the user interface 800 that includes the one or more keywords 804 may be associated with uncompleted tasks for items corresponding to the one or more keywords 804 during a current shopping journey at a store.

The user interface 800 may include an area 810 for presenting item detail information 812 for an item added to a cart and instructions 814 on how to pay for the items added to the cart. The user interface 800 may also depict an indication 816 for a newly added keyword 818. For example, a user may be shopping in a store when someone who has access and is authorized to modify the shopping list and add a keyword, such as keywords 804, to the shopping list. The area 802 of the user interface 800 may dynamically update in response to receiving input that corresponds to an added or removed keyword 804 of the shopping list. The newly added keyword 818 may also include information on which user or entity added the keyword as well as when the keyword was added. The user interface 800 may be updated in response to receiving the new keyword 818 or information about the new keyword 818 to depict an indication 816 or otherwise highlight that the keyword 818 is newly added to the shopping list. In embodiments, the indication 816 may include changes to a font color, a font type, a color update to that particular area of the user interface 802, an audio cue, or any suitable visual or audio indicators or cues that draw attention to the newly added keyword 818 within user interface 800.

Figure 9:
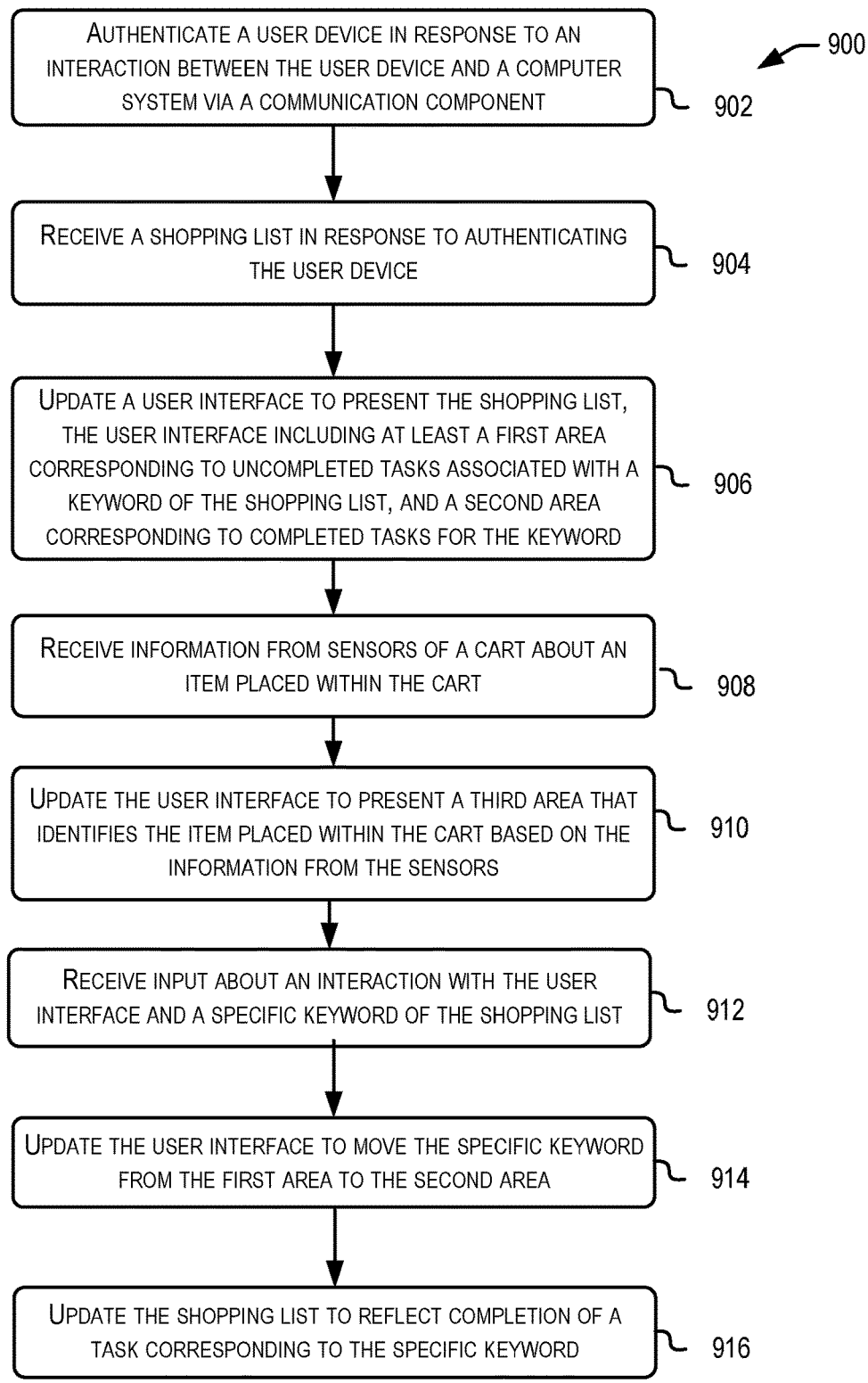
FIG. 9 depicts an illustrative example of a flow diagram for a shopping list feature, in accordance with embodiments.
Figure 10:
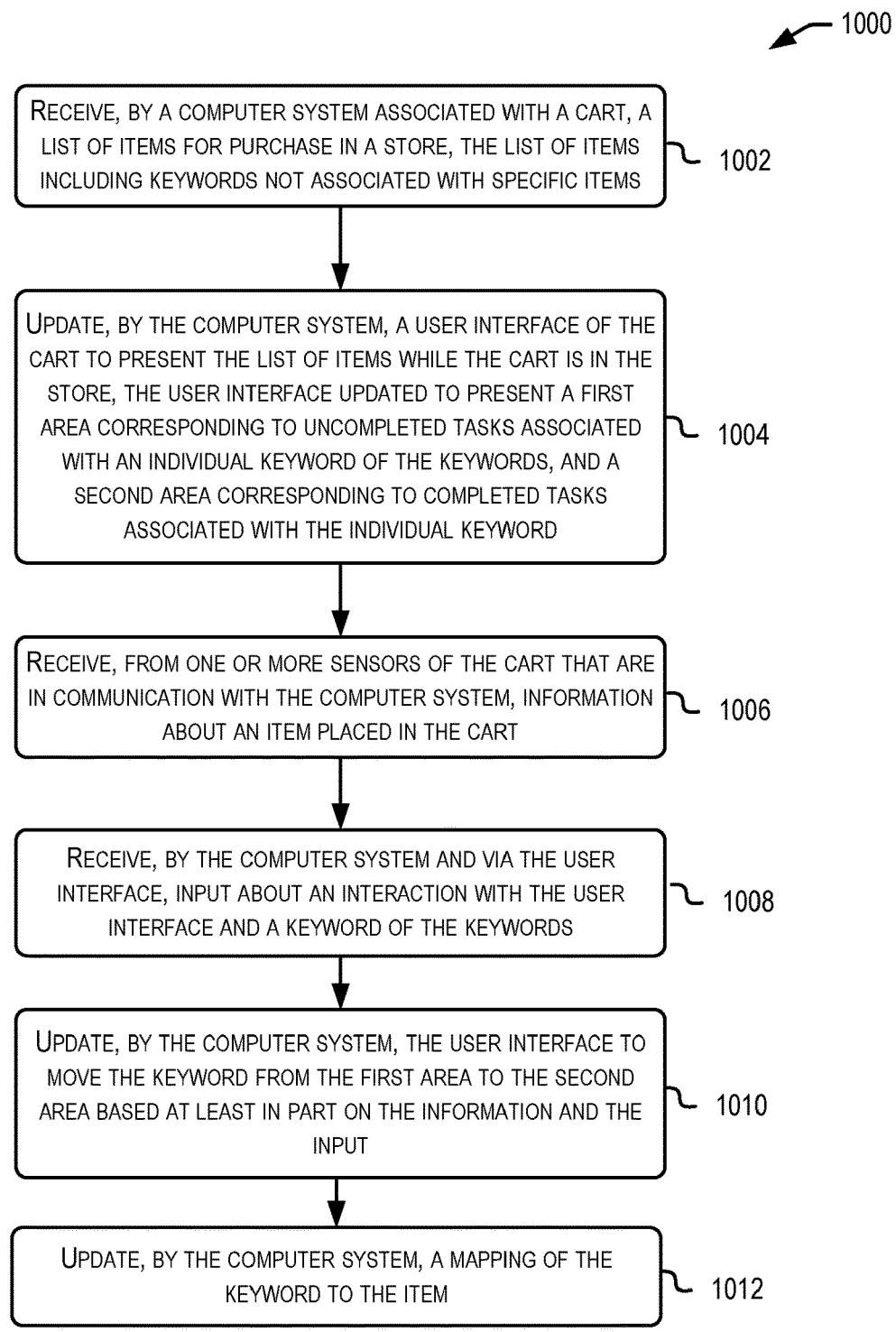
FIG. 10 depicts an illustrative example of a flow diagram for a shopping list feature, in accordance with embodiments.

FIGS. 9 and 10 depict illustrative examples of flow diagrams for a shopping list feature, in accordance with embodiments. Some or all of the processes 900 and 1000 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. In accordance with at least one embodiment, at least the one or more service provider computers 1114 of FIG. 11 and/or the components of FIG. 3 may perform the processes 900 and 1000 of FIGS. 9 and 10. The code may be stored on a computer-readable storage medium, for example, in the form of a computer program including a plurality of instructions executable by one or more processors. The computer-readable storage medium may be non-transitory.

The process 900 may begin at 902 with authenticating a user device in response to an interaction between the user device and a computer system via a communication component. For example, the user device may display or otherwise present a quick response (QR) code that contains information that may be utilized by the computer system to authenticate the user device or user. In embodiments, the communication component may be a sensor, a scanner, or other suitable reader for interacting with the QR code or other information provided by the user device. In embodiments, the communication component may be configured to interact with a machine-readable code generated by the user device. The machine-readable code may include a QR code, a bar code, a near field communication (NFC) tag, a Bluetooth receiver or transmitter, an radio frequency identifier (RFID) tag, or other suitable technologies for communicating an identifier or information utilized to identify an authenticate a user. In accordance with at least one embodiment, the communication component or other component of a cart or computer system of the cart may be configured to receive and process a biometric sample from a user to authenticate the user. For example, a user may provide an audio biometric, a finger print biometric, or an iris biometric to authenticate themselves with a cart and/or a computer system of the cart. The process 900 may include, at 904, receiving a shopping list in response to authenticating the user device. In embodiments, the computer system may receive or otherwise obtain the shopping list from the user device or another computer system via one or more networks such as the Internet. In accordance with at least one embodiment, the shopping list may include a number of keywords that are not associated with specific items. For example, the shopping list may include the keyword "milk" without a designation of a specific brand or type of milk designated.

The process 900 may include, at 906, updating a user interface to present the shopping list. The user interface may include at least a first area corresponding to uncompleted tasks associated with a keyword of the shopping list and a second area corresponding to completed tasks for the keyword. For example, the keywords that correspond to items that a user wishes to purchase during a shopping trip at a store may be interacted with, via the user interface, to move the keyword from the first area to the second area in response to the user putting an item that corresponds to the keyword within the cart. The user may place almond milk in their cart, check off the keyword milk on their shopping list displayed on the user interface, and the keyword milk may be moved from the uncompleted tasks area of the user interface to the completed tasks area of the user interface. The process 900 may include, at 908, receiving information from sensors of the cart about an item placed within the cart. The computer system of the cart may be in communication with one or more sensors of the cart and receive information about a user placing one or more items in the cart. In embodiments, the sensors may include a barcode reader/scanner, cameras, radio frequency identifier (RFID) readers, near field communication receivers/transmitters, or one or more cameras for capturing images of the items placed in the cart. The computer system may be configured to utilize the information obtained by the sensors to identify a specific item placed within the cart. For example, the barcode reader/scanner may interact with a barcode of the item placed within the cart to obtain information that is transmitted to the computer system for identification of the specific item that corresponds to the obtained information.

The process 900 may include, at 910, updating the user interface to present a third area that identifies the item placed within the cart based at least in part on the information from the sensors. The third area may present item details for the item placed in the cart, such as a specific brand, quantity, dimensions, type, etc. The process 900 may include receiving input about an interaction with the user interface and a specific keyword of the shopping list at 912. For example, a user may interact with the user interface of the cart to indicate that a particular task for a keyword has been completed as the item that corresponds to the keyword has been placed in the cart. The process 900 may include, at 914, updating the user interface to move the specific keyword from the first area to the second area. The movement of the keyword from the first area to the second area of the user interface may serve as a visual indicator or reminder to the user that they have completed the task for that particular keyword by adding the corresponding item to the cart. In some embodiments, the computer system may prompt or query, via the user interface, the user to confirm the keyword and movement of the keyword to the completed task portion of the user interface (second area). The process 900 may include, at 916, updating the shopping list to reflect completion of a task corresponding to the specific keyword. In embodiments, the shopping list may be presented to a number of authorized users via various user devices. In accordance with at least one embodiment, as a user interacts with items by adding them to a cart, interacts with the user interface to move a keyword to reflect completion of a task corresponding to the keyword, the shopping list can be updated across all maintained shopping lists visible by other authorized users. In embodiments, the computer system and/or user device may communicate, via one or more networks, to a server computer that maintains the shopping list to update the completion of the task corresponding to a keyword. By updating a shopping list dynamically all authorized users can be informed as tasks are complete and lists can be maintained in a uniform manner.

The process 1000 may include, at 1002, receiving, by a computer system associated with a cart, a list of items for purchase in a store. The list of items may include keywords that are not associated with specific items. The process 1000 may include, at 1004, updating, by the computer system, a user interface of the cart to present the list of items while the cart is in the store. In embodiments, the user interface may be updated to present a first area corresponding to uncompleted tasks associated with an individual keyword of the keywords, and a second area corresponding to completed tasks associated with the individual keyword. The process 1000 may include, at 1006, receiving, from one or more sensors of the cart that are in communication with the computer system, information about an item placed in the cart.

The process 1000 may include receiving, by the computer system and via the user interface, input about an interaction with the user interface and a keyword of the keywords at 1008. In embodiments, the user interface may be configured to receive input from a user utilizing an input/output device associated with the user interface, gestures, or other suitable input that is associated with a user interacting with the user interface of the cart. The process 1000 may include, at 1010, updating, by the computer system, the user interface to move the keyword from the first area to the second area based at least in part on the information and the input. The process 1000 may include updating, by the computer system, a mapping of the keyword to the item at 1012.

Figure 11:
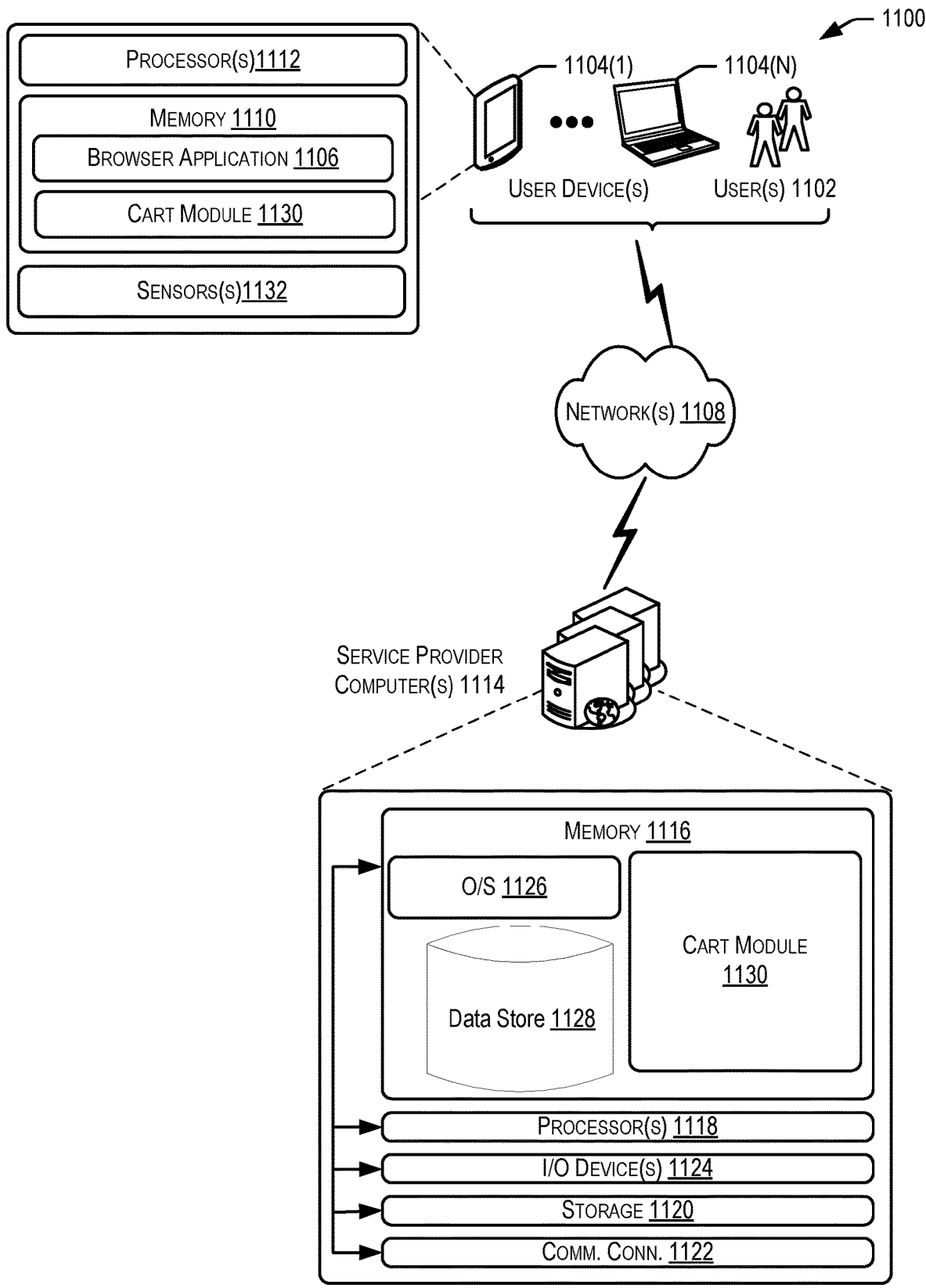
FIG. 11 depicts an illustrative example of a system or architecture in which techniques for implementing the shopping list feature may be implemented, in accordance with embodiments.

FIG. 11 depicts an illustrative example of a system or architecture 1100 in which techniques for implementing the shopping list feature may be implemented, in accordance with embodiments. In architecture 1100, one or more users 1102 may utilize user computing devices 1104(1)-(N) (collectively, user devices 1104) to access a browser application 1106 (e.g., a web browser) or a user interface (UI) accessible through the browser application 1106, via one or more networks 1108. The "browser application" 1106 can be any browser control or native application that can access and display a network page or other information. In some aspects, the browser application 1106 may be hosted, managed, and/or provided by a computing resources service or service provider, such as by utilizing one or more service provider computers 1114. The one or more service provider computers 1114 may, in some examples, provide computing resources such as, but not limited to, client entities, low latency data storage, durable data storage, data access, management, virtualization, hosted-computing-system-based software solutions, electronic content performance management, etc. The one or more service provider computers 1114 may also be operable to provide web or network hosting, computer application development, and/or implementation platforms, combinations of the foregoing, or the like to the one or more users 1102.

In one illustrative configuration, the user devices 1104 may include at least one memory 1110 and one or more processing units or processor(s) 1112. The processor(s) 1112 may be implemented as appropriate in hardware, computer-executable instructions, firmware, or combinations thereof. Computer-executable instruction or firmware implementations of the processor(s) 1112 may include computer-executable or machine-executable instructions written in any suitable programming language to perform the various functions described. The user devices 1104 may also include geo-location devices (e.g., GPS device or the like) for providing and/or recording geographic location information associated with the user devices 1104.

The memory 1110 may store program instructions that are loadable and executable on the processor(s) 1112, as well as data generated during the execution of these programs. Depending on the configuration and type of user device 1104, the memory 1110 may be volatile (such as random access memory (RAM)) and/or non-volatile (such as read-only memory (ROM), flash memory, etc.). The user device 1104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1110 may include multiple different types of memory, such as static random access memory (SRAM), dynamic random access memory (DRAM), or ROM.

Turning to the components of the memory 1110 in more detail, the memory 1110 may include an operating system and one or more application programs or services for implementing the features disclosed herein via the browser application 1106 or dedicated applications (e.g., smart phone applications, tablet applications, etc.). The browser application 1106 may be configured to receive, store, and/or display a website, a link to an electronic marketplace, or other interface for interacting with the one or more service provider computers 1114 such as displaying a shopping list of items or keywords. Additionally, the memory 1116 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 1102 provided response to a security question or a geographic location obtained by the user device 1104. In embodiments, the user device 1104 may be configured to communicate with sensors of a cart via one or more networks and/or communication technologies such as Bluetooth or wireless connectivity. The user device 1104 may be configured to perform the features of the shopping list feature discussed with reference to FIGS. 1-8 upon authenticating the user.

In some examples, the networks 1108 may include any one or a combination of many different types of networks, such as cable networks, the Internet, wireless networks, cellular networks and other private and/or public networks. While the illustrated example represents the users 1102 accessing the browser application 1106 over the networks 1108, the described techniques may equally apply in instances where the users 1102 interact with the one or more service provider computers 1114 via the one or more user devices 1104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 1106 may allow the users 1102 to interact with the one or more service provider computers 1114, such as to access content like webpages or network pages. The one or more service provider computers 1114, perhaps arranged in a cluster of servers or as a server farm, may host the browser application 1106 and/or cloud-based software services. Other server architectures may also be used to host the browser application 1106 and/or cloud-based software services. The browser application 1106 may be capable of handling requests from many users 1102 and serving, in response, various user interfaces that can be rendered at the user devices 1104 such as, but not limited to, a webpage, a web site, network site, a network page, a shopping list, a representation of a store layout, one or more routes through the representation or other user interface updates described herein. The browser application 1106 can interact with any type of website or network site that supports user interaction, including social networking sites, electronic retailers, informational sites, blog sites, search engine sites, news and entertainment sites, and so forth. The described techniques can similarly be implemented outside of the browser application 1106, such as with other applications running on the user device 1104.

The one or more service provider computers 1114 may be any type of computing device such as, but not limited to, a mobile phone, a smart phone, a personal digital assistant (PDA), a laptop computer, a desktop computer, a server computer, electronic book (e-book) reader, a thin-client device, a tablet PC, etc. Additionally, it should be noted that in some embodiments, the one or more service provider computers 1114 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 1114 may be in communication with the user device 1104 via the networks 1108, or via other network connections. The one or more service provider computers 1114 may include one or more servers, perhaps arranged in a cluster or as individual servers not associated with one another. The one or more service provider computers 1114 may be in communication with one or more third party computers, one or more sensors, or one or more computer systems (not pictured) via networks 1108. The one or more service provider computers 1114 that host the browser application 1106 may obtain and provide data to third party computers, one or more sensors, or one or more computer systems via networks 908 in accordance with embodiments described herein.

In one illustrative configuration, the one or more service provider computers 1114 may include at least one memory 1116 and one or more processing units or processors(s) 1118. The processor(s) 1118 may be implemented as appropriate in hardware, computer-executable instructions, firmware, or combinations thereof. Computer-executable instruction or firmware implementations of the processor(s) 1118 may include computer-executable or machine-executable instructions written in any suitable programming language to perform the various functions described. The memory 1116 may store program instructions that are loadable and executable on the processor(s) 1118, as well as data generated during the execution of these programs. Depending on the configuration and type of the one or more service provider computers 1114, the memory 1116 may be volatile (such as RAM) and/or non-volatile (such as ROM, flash memory, etc.). The one or more service provider computers 1114 or servers may also include additional storage 1120, which may include removable storage and/or non-removable storage. The additional storage 1120 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1116 may include multiple different types of memory, such as SRAM, DRAM, or ROM.

The memory 1116, the additional storage 1120, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 1116 and the additional storage 1120 are all examples of computer storage media. Additional types of computer storage media that may be present in the one or more service provider computers 1114 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium, which can be used to store the desired information and which can be accessed by the one or more service provider computers 1114. Combinations of any of the above should also be included within the scope of computer-readable media.

The one or more service provider computers 1114 may also contain communication connection(s) 1122 that allow the one or more service provider computers 1114 to communicate with a stored database, another computing device or server, user terminals and/or other devices on the networks 1108. The one or more service provider computers 1114 may also include I/O device(s) 1124, such as a keyboard, a mouse, a pen, a voice input device, a touch input device, a display, speakers, a printer, etc.

Turning to the contents of the memory 1116 in more detail, the memory 1116 may include an operating system 1126, one or more data stores 1128 and/or one or more application programs, services, or other software modules, which are generally executed by a processor (e.g., the processors 1112 and/or 1118) for implementing the features disclosed herein.

An example module is shown in FIG. 11, but functions and embodiments described herein can utilize a subset of the features provided by the module and/or additional functions can be provided. Additionally, while the example module will now be briefly discussed with regard to FIG. 11, further specific details regarding the example module is provided herein in the descriptions of the Figures.

As an example module of memory 1116, a cart module 1130 can be provided for receiving, sending, updating, and/or otherwise processing information about the users 1102, a shopping list generated by users 1102, information from sensors of a cart in a store, information from a store or a computer system or database associated with a store. In embodiments, the cart module 1130 may be configured to generate, transmit, and update a user interface configured to be displayed on the user device 1104. The user interface may display information about a shopping list generated by users 1102, update based on information from sensors 1132, authenticate user 1102 based on information from user device 1104 or other user devices (not pictured), and implement a machine learning algorithm that uses data obtained by the user 1102 interacting with the user interface and shopping list. In embodiments, the cart module 1130 may train a machine learning algorithm to map keywords of a shopping list generated by a user 1102 to specific items offered by a store to predict a specific item from a keyword for future list generation, user interface features, recommendations, and other features described herein. In embodiments, the cart module 1130 of user device 1104 may perform some or all of the features of the cart module 1130. In accordance with at least one embodiment, the cart module 1130 may communicate with one or more computer systems (not pictured) to perform services associated with the features described herein including authentication of the user 1102 or user device 1104, or payment settlement at the conclusion of a shopping journey.

Figure 12:
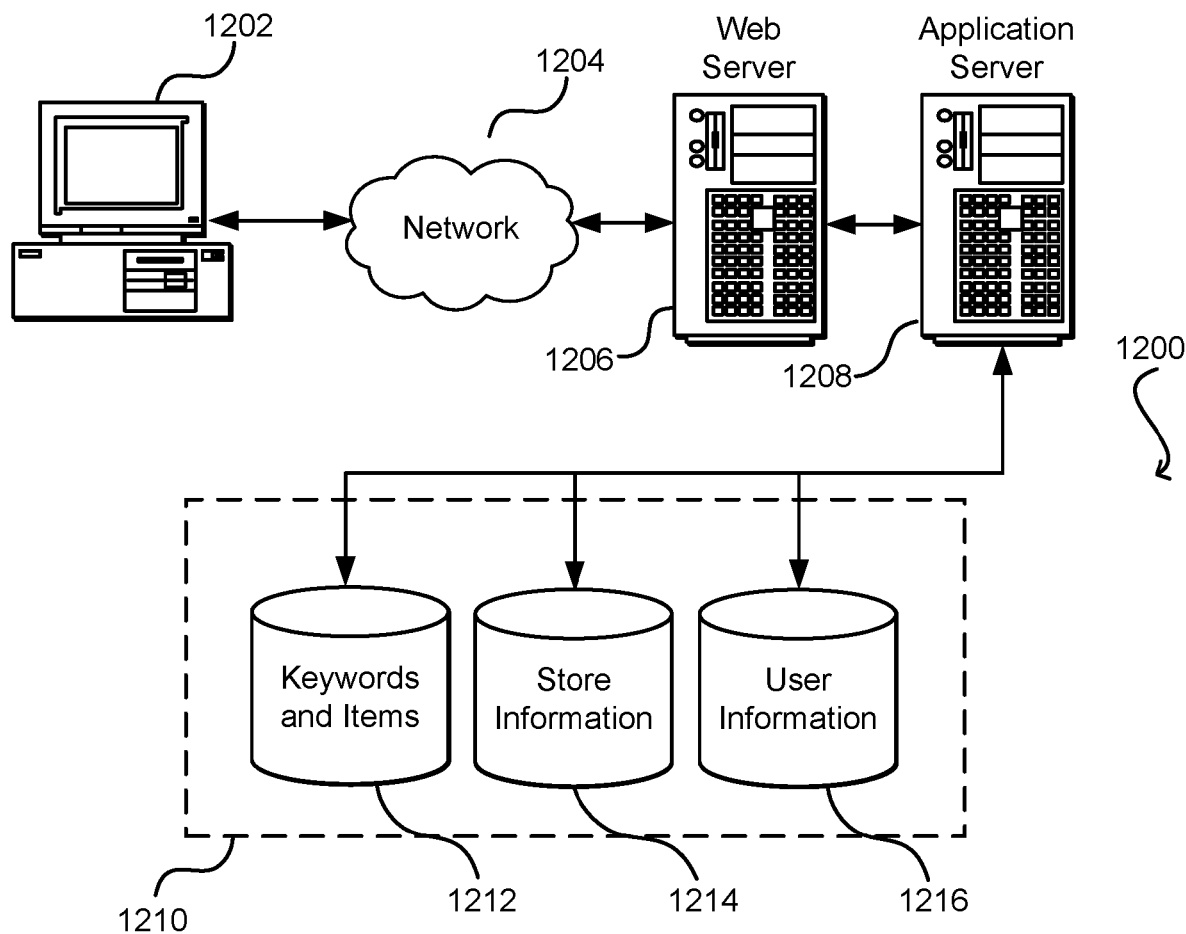
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server 1206. It should be understood that the Web and application servers, 1206, and 1208 respectively, are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing keywords and items 1212 and user information 1216, which can be used to serve content for the production side, map specific items to keywords, map keywords to items, identify custom shopping lists, authenticate users, or generate recommended keywords, items, or other suggestions during a shopping journey. The data store also is shown to include a mechanism for storing store information 1214, which can be used for reporting, analysis, or other such purposes such as generating representations of layout of a store which may be integrated in a user interface to help guide a user to one or more items or routes in a store, or maintain inventory lists for various stores. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store 1210 might access the user information 1216 to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving, by a computer system associated with a cart, a list of items for purchase in a store, the list of items including keywords not associated with specific items;
    updating, by the computer system, a user interface of the cart to present the list of items while the cart is in the store, the user interface updated to present a first area corresponding to uncompleted tasks associated with an individual keyword of the keywords, and a second area corresponding to completed tasks associated with the individual keyword of the keywords;
    receiving, from one or more sensors of the cart that are in communication with the computer system, information about an item placed in the cart by a user;
    receiving, by the computer system and via the user interface, first input about an interaction with the user interface and a keyword of the keywords;
    updating, by the computer system, the user interface to move the keyword from the first area to the second area based at least in part on the information and the first input;
    updating, by the computer system, a mapping of the keyword to the item;
    implementing, by the computer system, a machine-learning algorithm that uses the mapping of the keyword, the list of items, the keywords, and the first input to predict a specific item to replace a specific keyword of the keywords on a subsequent list of items;
    replacing, by the computer system, the keyword with the item in the list of items on the subsequent list of items that includes the keyword;
    updating, by the computer system, the user interface to present a representation of a layout of the store and indications of locations of a portion of the list of items that correspond to the keywords in response to second input received via the user interface, the user interface presenting a location of the cart within the representation of the layout;
    updating, by the computer system, an order of presentation of a list of the keywords in the user interface based at least in part on the location of the cart within the representation of the layout; and
    generating, by the computer system, a route that indicates an order of the locations within the representation of the layout of the store to obtain the portion of the list of items that correspond to the keywords based at least in part on receiving the list of keywords and an order of items historically added to the cart during previous sessions associated with a user device of the user.

2. The computer-implemented method of claim 1, wherein receiving the list of items is based at least in part on authenticating the user device, the user device authenticated based on the computer system interacting with a machine-readable code provided by the user device to the computer system.

3. The computer-implemented method of claim 1, wherein the user interface identifies an entity that added each keyword to the list of items.

4. The computer-implemented method of claim 1, further comprising identifying a specific list of items from a plurality of lists of items based at least in part on user input provided via the user device, the list of items being one of the plurality of lists of items.

5. The computer-implemented method of claim 4, further comprising selecting the specific list of items from the plurality of lists of items based at least in part on geolocation data of the user device.

6. The computer-implemented method of claim 1, wherein the keywords of the list of items is generated, by the computer system, based on aggregated information from a plurality of lists of items provided by other users.

7. The computer-implemented method of claim 1, further comprising modifying the keywords of the list of items based at least in part on purchase history of one or more items and a certain time period associated with the one or more items.

8. A computer-readable storage medium storing computer-executable instructions that, when executed by a processor, cause a computer system to at least:

receive a list of keywords associated with a user device, a keyword of the list of keywords not associated with a specific item of a list of items offered by a store;

update a user interface to present the list of keywords, the user interface updated to present a first area corresponding to uncompleted tasks associated with an individual keyword of the list of keywords, and a second area corresponding to completed tasks associated with the individual keyword of the list of keywords;

receive information from one or more sensors about an item placed within a cart by a user, the one or more sensors dispersed in or around the cart, the computer system operatively coupled to the cart;

receive first input about an interaction with the user interface and a specific keyword of the list of keywords;

update the user interface to move the specific keyword from the first area to the second area based at least in part on the first input;

update a mapping of the specific keyword to the item;

implement a machine-learning algorithm that uses the mapping of the specific keyword, the list of keywords, and the first input to predict a specific item to replace the specific keyword on a subsequent list of keywords;

replace the specific keyword with the item on the subsequent list of keywords that includes the specific keyword;

update the user interface to present a representation of a layout of the store and indications of locations of a portion of the list of items that correspond to keywords of the list of keywords in response to second input received via the user interface, the user interface presenting a location of the cart within the representation of the layout;

update an order of presentation of the list of the keywords in the user interface based at least in part on the location of the cart within the representation of the layout; and generate a route that indicates an order of the locations within the representation of the layout of the store to obtain the portion of the list of items that correspond to the keywords based at least in part on receiving the list of keywords and an order of items historically added to the cart during previous sessions associated with a user device of the user.

9. The computer-readable storage medium of claim 8, wherein the instructions further cause the computer system to at least receive second input, via the user interface, that corresponds to a request to map items that associated with the list of keywords to physical locations in the store offering the items.

10. The computer-readable storage medium of claim 8, wherein the instructions further cause the computer system to at least:

receive, via the user interface, third input that corresponds to a request to map the specific keyword in the representation of the layout; and update the user interface to present the representation of the layout and a physical location of the item that corresponds to the specific keyword within the representation of the layout.

11. The computer-readable storage medium of claim 8, wherein the instructions further cause the computer system to at least update an order of presentation of the list of keywords in the user interface based at least in part historic information that corresponds to previous additions of items within the cart, the previous additions of items corresponding to the list of keywords.

* * * * *